(12) United States Patent
Kumar et al.

(10) Patent No.: US 10,380,634 B2
(45) Date of Patent: Aug. 13, 2019

(54) INTENT INFERENCE OF WEBSITE VISITORS AND SALES LEADS PACKAGE GENERATION

(75) Inventors: Srihari Kumar, Cupertino, CA (US); Shreesha Ramdas, Saratoga, CA (US); Gururaj Rao, Bangalore (IN)

(73) Assignee: Callidus Software, Inc., Dublin, CA (US)

( * ) Notice: Subject to any disclaimer, the term of this patent is extended or adjusted under 35 U.S.C. 154(b) by 1375 days.

(21) Appl. No.: 12/618,126

(22) Filed: Nov. 13, 2009

(65) Prior Publication Data

US 2010/0131835 A1  May 27, 2010

Related U.S. Application Data

(60) Provisional application No. 61/117,098, filed on Nov. 22, 2008, provisional application No. 61/230,691, filed on Aug. 1, 2009, provisional application No. 61/248,546, filed on Oct. 5, 2009.

(51) Int. Cl.
| | |
|---|---|
| *G06Q 10/06* | (2012.01) |
| *G06Q 10/10* | (2012.01) |
| *G06Q 30/02* | (2012.01) |

(52) U.S. Cl.
CPC ..... *G06Q 30/0255* (2013.01); *G06Q 30/0224* (2013.01); *G06Q 30/0269* (2013.01)

(58) Field of Classification Search
CPC ......... G06Q 30/02; G06Q 10/06; G06Q 10/10
USPC .................... 705/7, 10, 14, 7.11, 14.49, 7.29
See application file for complete search history.

(56) References Cited

U.S. PATENT DOCUMENTS

| | | | |
|---|---|---|---|
| 7,698,270 B2* | 4/2010 | Brave et al. .................. 707/603 |
| 8,078,607 B2* | 12/2011 | Oztekin ............ G06F 17/30867 707/708 |
| 2002/0109729 A1* | 8/2002 | Dutta ............................ 345/790 |
| 2002/0161779 A1* | 10/2002 | Brierley et al. .......... 707/103 R |
| 2006/0229942 A1* | 10/2006 | Miller et al. .................... 705/14 |
| 2006/0288000 A1 | 12/2006 | Gupta |
| 2007/0239604 A1* | 10/2007 | O'Connell et al. ............. 705/50 |
| 2007/0260597 A1* | 11/2007 | Cramer .............................. 707/5 |
| 2008/0208947 A1 | 8/2008 | Shapira et al. |
| 2008/0294523 A1* | 11/2008 | Little ............................. 705/14 |
| 2008/0301541 A1* | 12/2008 | Karidi ............... G06F 17/30896 715/206 |
| 2009/0018918 A1* | 1/2009 | Moneypenny et al. ........ 705/14 |
| 2009/0083244 A1* | 3/2009 | Li ...................... G06F 17/30867 |
| 2009/0089151 A1* | 4/2009 | Protheroe et al. .............. 705/10 |
| 2009/0109037 A1* | 4/2009 | Farmer ................ G06Q 20/102 340/576 |
| 2009/0132368 A1* | 5/2009 | Cotter et al. .................... 705/14 |
| 2010/0088152 A1* | 4/2010 | Bennett ........................... 705/10 |

FOREIGN PATENT DOCUMENTS

| | | |
|---|---|---|
| KR | 1020000017873 A | 4/2000 |
| WO | 2007079032 A2 | 7/2007 |

\* cited by examiner

*Primary Examiner* — Nga B Nguyen

(57) ABSTRACT

A system for inferring intent of visitors to a Website has a visitor-tracking application executing from a digital medium coupled to a server hosting the Website, the server connected to a repository adapted to store data about visitor behavior, and an inference engine for processing the data to infer the intent of visitors. Visitor behavior relative to links is tracked, and intent of a visitor is inferred from one or both, or a combination of analysis of the behavior and deducing meaning for anchor text of links selected.

12 Claims, 9 Drawing Sheets

US 10,380,634 B2

INTENT INFERENCE OF WEBSITE VISITORS AND SALES LEADS PACKAGE GENERATION

CROSS-REFERENCE TO RELATED DOCUMENTS

The present application claims priority to provisional patent application Ser. Nos. 61/117,098, filed on Nov. 22, 2008, 61/230,691, filed Aug. 1, 2009, and 61/248,546, filed Oct. 5, 2009. Each application above is incorporated in its entirety, at least by reference.

BACKGROUND OF THE INVENTION

1. Field of the Invention

The present invention is in the field of ecommerce and pertains particularly to methods and apparatus for inferring intent of Web visitors and generating leads based on the inferred intent other information about visitors and Website visits.

2. Discussion of the State of the Art

In the field of ecommerce, it is desired that information about visitors to ecommerce pages be made available to site owners for the purpose of leveraging information captured about the visitors to the site to increase sales revenue of the site through proactive contact with those potential customers.

It is known that servers track Website visitors by recording their browser behavior at the site especially the sequence of URLs clicked on by the visitor during site navigation. Information about each visitor to the site is collected where information is available and recorded so that owners/operators of the site may utilize the information in an attempt to reach potential new customers who have visited the site but who had not become customers of the site. Tracking cookies are one method that is used to track browser navigation and search behavior of online visitors in an attempt to determine what the visitors are interested in.

In many cases custom advertisements in the form of banner ads and other types of advertising are pushed to visitor's Internet appliances where the visitors exhibited some definitive pattern in Web navigation and/or some pattern in searching the Internet. An advertiser seeks to deliver advertising that might be relevant to what the visitor may be interested in at the time. Gathering data about online activity of persons is often used in addition to profile data, survey data, etc. to attempt to determine what interest patterns exist for the user and therefore what products and services that user might be interested in.

Much of this kind of visitor monitoring and data gathering is semi-automated at best and much manual work is required in order to determine interests of a user to any degree of authenticity. Moreover, much visitor behavior online may not be simpatico to visitor behaviors offline such as store purchase histories, hobbies, work patterns, spending patterns, and general demographics. Another challenge is categorizing visitors into one or more groups having the same general product or service interest that would serve as a potential marketing base for a proactive campaign to offer products or services to those visitors.

Therefore, what is clearly needed is a system for monitoring and recording visitor behavior and for inferring intent of visitors to a Web interactive or Website in a manner that correlates the inference data with other data gathered using more traditional techniques that would result in better granularity of visitor intent at the site and in general would provide more robust information for group categorization and generation of better qualified leads.

SUMMARY OF THE INVENTION

In a preferred embodiment of the present invention a system for inferring intent of visitors to a Website is provided, comprising a visitor-tracking application executing from a digital medium coupled to a server hosting the Website, the server connected to a repository adapted to store data about visitor behavior, and an inference engine for processing the data to infer the intent of visitors. In this system visitor behavior relative to links is tracked, and intent of a visitor is inferred from one or both, or a combination of analysis of the behavior and deducing meaning for anchor text of links selected.

In one embodiment the Website consists of one or more Web pages. Also in one embodiment the one or more Web pages include one or more blogs, news articles, or ecommerce pages. The visitor behavior recorded may include mouseover or clicking on a link with anchor text. The visitor behavior tracked may also mousing over and clicking on hypertext wherein such recorded behavior and time associated therewith is used to fine tune the level of visitor intent.

In some embodiments there may be one or more application program interfaces (APIs) to one or more third-party data-gathering and holding services and wherein such data if discovered is used to fine tune level of intent of the visitor and to identify the visitor without ambiguity. Also in some embodiments one or more of the anchor text instances may point to a multimedia presentation, an interactive form, or a data download or upload interface.

In some embodiments the system may include a data mining application for navigating to external data sources and acquiring data from those external data sources and wherein that data, if discovered, is used to fine tune the level of visitor intent and to identify the visitor without ambiguity. In some cases the data miner is enabled to mine data from a visitor-subscribed Website using a login token.

Visitor behavior in some cases may include acts of screen capture and or highlighting or download of text or images. The recorded behavior and the time associated therewith is used to fine tune the level of visitor intent. In some embodiments the data about one or more visitors and about visitor behavior including intent is packaged as one or more sales leads presented in a sales information capsule to potential buyers.

In another aspect of the invention a method for inferring intent of visitors to a Website includes the steps of (a) tracking visitor behavior by a visitor-tracking application executing from a digital medium coupled to a server hosting the Website, the server connected to a repository adapted to store data about visitor behavior; and (b) inferring intent of visitors from the data by an inference engine deducing meaning of anchor text of links selected by a visitor, and/or visitor behavior relative to the links.

In one embodiment the Website consists of one or more Web pages. Also in one embodiment the one or more Web pages may include one or more blogs, news articles, or ecommerce pages. Visitor behavior recorded may include mouseover or clicking on a link with anchor text, and such recorded behavior and time associated therewith is used to fine tune the level of visitor intent.

In some embodiments there may be one or more application program interfaces (APIs) to one or more third-party data-gathering and holding services and wherein such data if discovered is used to fine tune level of intent of the visitor and to identify the visitor without ambiguity. Also in some embodiments one or more of the anchor text instances may point to a multimedia presentation, an interactive form, or a data download or upload interface.

In some embodiments there may be a data mining application for navigating to external data sources and acquiring data from those external data sources and wherein that data, if discovered, is used to fine tune the level of visitor intent and to identify the visitor without ambiguity. The data miner may be enabled to mine data from a visitor-subscribed Website using a login token.

In various embodiments visitor behavior include acts of screen capture and or highlighting or download of text or images and wherein that recorded behavior and the time associated therewith is used to fine tune the level of visitor intent. Further, the data about one or more visitors and about visitor behavior including intent is packaged as one or more sales leads presented in a sales information capsule to potential buyers.

BRIEF DESCRIPTION OF THE DRAWING FIGURES

DETAILED DESCRIPTION

The inventors provide in one embodiment a system for inferring the intent of online visitors and for automatically generating leads based on the inferences wherein such leads may be categorized by similar intent into groups or clusters and wherein such leads may be packaged interactively for sale to organizations willing to purchase them for proactive engagement purposes. The system and methods of the present invention are described in enabling detail using the following examples, which may describe more than one embodiment of the invention.

Figure 1:
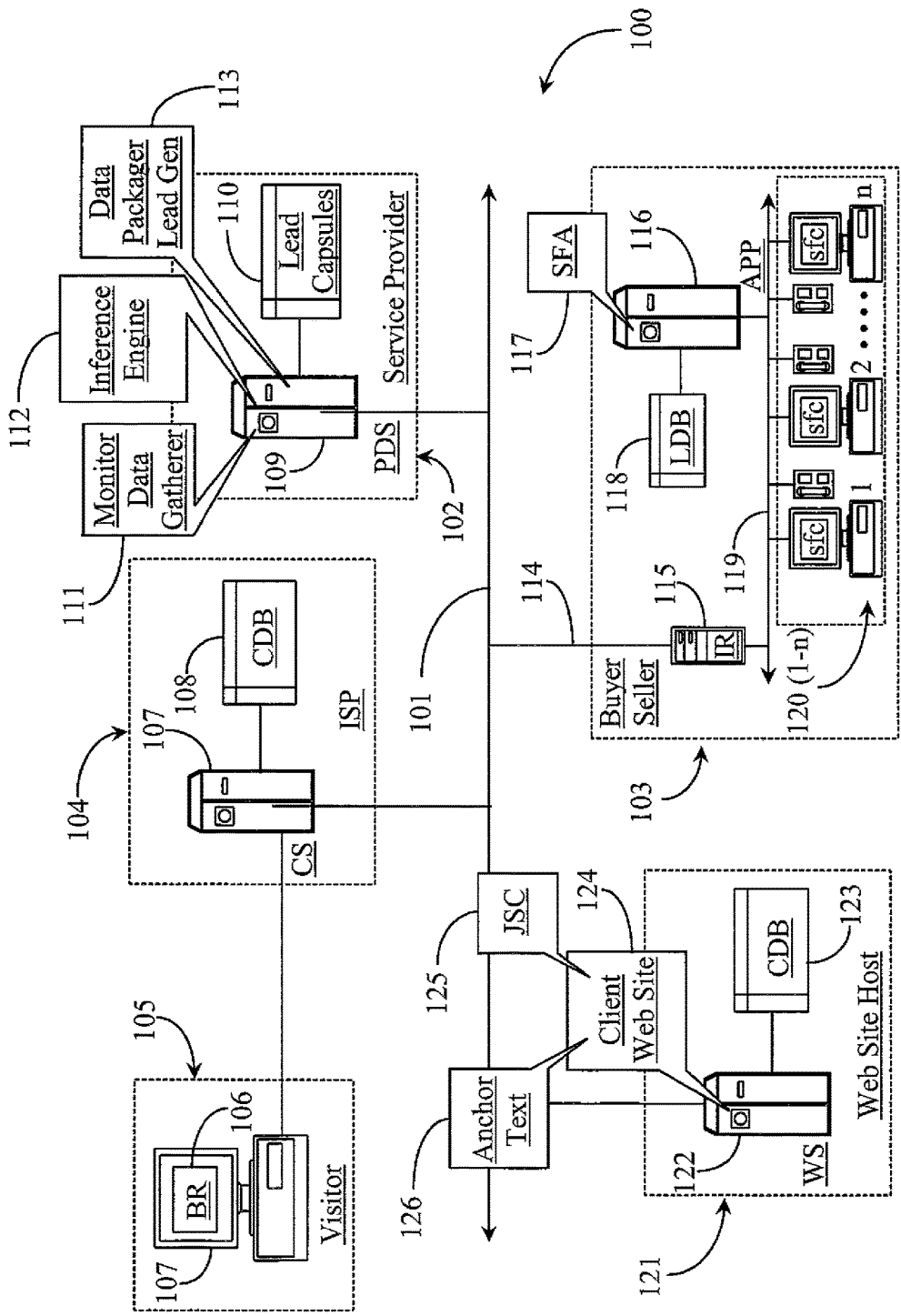
FIG. 1 is an architectural overview of a communications network supporting inference of Web visitor intent according to an embodiment of the present invention.

FIG. 1 is an architectural overview of a communications network 100 supporting inference of Web visitor intent according to an embodiment of the present invention. Communications network 100 incorporates the well known Internet network characterized by the World Wide Web (WWW) and illustrated herein as an Internet backbone 101. Internet backbone 101 represents all of the lines, equipment, and access points that make up the Internet network as a whole. Therefore, there are no geographic limitations to the practice of the present invention.

Internet 101 is navigable by visitors operating an Internet-capable appliance such as a visitor 105 operating Internet-capable appliance 107, which is a personal computer (PC) in this example. Visitor 105 navigates Internet 101 using PC 107 running an instance of browser application 106. Other Internet-capable appliances may be used to navigate the Internet such as a smart phone, laptop, personal digital assistant (PDA) and many 3G cellular telephones. In this example visitor 105 utilizes a local Internet Service Provider (ISP) 104 to connect to Internet network 101. Any of several Internet connection schemes may be used by visitor 105 to connect to Internet 101 such as dial-up modem, cable modem, wireless modem, broadband, digital services line (DSL), or the like. ISP 104 includes a connection server (CS) 107 having access to Internet backbone 101 and a customer database 108 connected to CS 107 for storing customer account and contact data. CS 107 is coupled to a digital medium adapted to store data and software required to enable connection server function.

Contact data held in CDB 108 may include customer name, customer address, telephone number, IP address of the customer's primary Internet-capable appliance used to connect online, email address, and other relevant information. Customer account data may include services and products purchased through the ISP and used to enhance the Internet experience of the customer, credit card information, payment history, user name and password data, and the like. The information held in CDB 108 is typically private and is not made available to other organizations unless ordered by a court as a result of a search warrant relevant to a criminal investigation.

A Website hosting service 121 is illustrated in this example and represents any organization that hosts Website services for individuals and organizations. Website host 121 includes a Web server 122 is coupled to a digital medium adapted for storing the data and software required to enable server function. WS 122 has a plurality of Websites created and managed for clients like client Website 124. WS 122 has connection to Internet backbone 101 and to a customer database 123 for storing customer contact and account data of customers and organizations contracting with the Website host for Website hosting services.

A service provider 102 is illustrated in this example and represents a company or organization that provides the service and system of the present invention. Service provider 102 includes a processing data server (PDS) 109 coupled to a digital medium adapted to contain all of the software and data required to enable server function. PDS 109 has connection to Internet backbone 101 and is connected to a lead capsule database 110 that is adapted to store lead data generated by the service relative to visitors visiting participating Websites like client Website 124, for example.

A buyer or seller organization 103 is illustrated in this example and represents either a company or organization willing to sell leads generated from visitor navigation patterns, among other criteria, to their Website or an organization that wishes to buy leads generated from Website monitoring and lead information development through use of the present invention. It is noted herein that in accordance with a service enabled by the present invention, such service offering an exchange over which users may buy and sell leads, an entity may be a buyer or a seller, or both so long as the buyer account is separate from the seller account. In this respect an exchange is provided for sellers and buyers to contract such services from service provider 102. Buyer or seller organization 103 may be a business, a company, or an individual operating from a single account or individual company representatives. In this example, buyer/seller 103 is a company or organization. Buyer/seller 103 has a local area network (LAN) 119 operating therein that is connected to Internet backbone 101 through an Internet router (IR) 115. LAN 119 is transfer control protocol/Internet protocol (TCP/IP) enabled.

In one aspect of this embodiment, entity 103 is a buyer that contracts with service provider 102 to purchase sales leads that meet the criteria of the offered line of products and services available to customers through the entity. In one embodiment entity 103, as a buyer, may purchase leads developed from its' Website and leads developed from other Websites where those Website owner/operators wish to sell leads developed from their sites by service provider 102. LAN 119 supports an application server (APP) 116 coupled to a digital medium adapted to contain all of the data and software required to enable server function. APP server 116 is adapted to host one or more enterprise applications that aid in fulfillment of certain goals of the enterprise. In this case one of the enterprise goals is sales and a well-known application termed sales force application (SFA) 117 is provided on and is executable from the digital medium coupled with the APP server. SFA 117 represents a parent/client application that enhances and aids the sales process undertaken by representatives of the organization.

LAN 119 supports a plurality of workstations 120 (1-*n*). Workstations 120 (1-*n*) include a LAN-connected PC and a telephone in each station. Workstations 120 (1-*n*) are manned by sales people whose responsibility it is to generate sales for the entity. An object of the present invention is to provide access to developed sales leads to sales people operating workstations 120 (1-*n*). Each PC in each workstation 120 (1-*n*) has a sales force client (sfc) displayed in the display screen of each PC. Each sales force client is a client desktop application of the parent SFA application 117 running on server 116. In a preferred embodiment of the present invention, service provider 102 entertains entity 103 as a client (lead buyer) for all of the sales people associated with the entity. However, it may be that individual sales people associated with entity 103 have individual accounts with service provider 102.

Considering entity 103 as a buyer and not a seller, it is important to note that the software of the present invention enabling purchase of one or more developed leads may be integrated with SFA 117 running on sever 116 in a manner that enables each sales person operating a workstations running a sfc to access filtered leads through a tab added to their sfc via software download or plug-in. PDS 109 has several SW applications installed on and executable from the digital medium coupled to the server. Consider that entity 103 buys leads developed from client Website 124 running on WS 122. In this case, client Website 124 may represent any client Website on the exchange that is willing to sell leads developed from the site.

One unique aspect of the present invention refers to one method of inferring intent from a Website visitor such as visitor 105. Client Website 124 includes numerous instances of anchor text 126 embedded in various positions throughout the structure or code of the Website, which may incorporate a plurality of separate Web pages and other interactives. Anchor text is used as visible text associated with a hyperlink to any other Website interactive such as, but limited to, another Web page, another Website, a download, a flash object, an image served, or a multimedia presentation served.

In some embodiments links may be associated to selectable vector graphics (SVG), and in these instances any anchor text may not be readily viewable by a person browsing the web page, but may nonetheless be retrieved and used in embodiments of the present invention.

Each client Website, in a preferred embodiment, is enhanced with an instance of Java Script Code (JSC) 125 obtained from service provider 102. JSC 125 runs on the Website and is adapted to automatically associate anchor text clicked on by a visitor to the Web interactive URL/URI that the anchor text invokes. The anchor text becomes a "tag" associated with the URL/URI of the associated interactive and may also be associated with any other user tags of the Web interactive including all of the keywords and phrases that may be extracted from the interactive. The interactive may be any HTML offering or multimedia offering that has a URL/URI that may be invoked by clicking on the associated anchor text.

A data monitor and gatherer 111 is provided on server 109 and is adapted to monitor visitor activity at a Website and gather any relevant data about the visitor and visit to the Website. Monitor 111 tracks, in one embodiment, the mouse movements of each visitor such as visitor 105 that visits client Website 124. Monitor/data gatherer 111 may be installed on the server that hosts the Website and may report back to service provider 102 to a parent application or directly to an inference engine 112, which is adapted to accept the data as input and to develop an inference as to the intent of the Web visitor.

In one embodiment phrases of interest are inferred by recording mouse movements associated with the anchor text wherein the anchor text is clicked on by the user. Monitor/data gatherer 111 may also record search terms used by the visitor and may develop phrases of interest based on search terms used. Monitor/data gatherer 111 may also track instances where the anchor text is hovered over by a visitor but not clicked on. Each Web page of client Website 124 is fully parsed such that all of the phrases, keywords, etc. are recorded for each page. In this way intent may be inferred by filtering out the keywords, phrases, etc. that are not interacted with to show, at least what the visitor was not particularly interested in.

Monitor/data gatherer 111 is adapted to record the time spent on the Website and the time spent interacting with any of the anchor text instances embedded in the Website, which hierarchically speaking are below the root anchor text in structure. Hover and click movements relative to hypertext (text that links to other text or resources) and anchor text (clickable text in hyperlinks) are both monitored and timed in terms of time spent by the visitor interacting with the structure. Monitor/data gatherer 111, in addition to recording the time spent interacting with the anchor text, also records the sequence of all of the anchor text instances that were interacted with over the whole Website.

As each Website has a hierarchical structure, so too does each anchor text tree beginning with the root text instances followed by anchor text instances on subsequent pages. For example, a start page may have several instances of anchor text wherein those instances each lead to additional Web pages and/or resources belonging to the same Website. So as the Web pages are structured in hierarchies, so too are each of the anchor text instances that are combined with hyperlinks leading to other resources and so on. Therefore the hierarchical structure of the anchor text tree can be compared to the hierarchical structure of the Website. Hence, phrases of interest (instances of anchor text) are equated to tags for each URL/URI that is invoked by an instance of anchor text leading to the page or resource. JSC 125 enables the automatic tagging and creation of the "tag tree" that represents the Website.

All of the above functionality serves to aid the inference engine 112 determine the intent of each Web visitor to Website 124. All of the raw data for each Web visitor that visits Website 124 is fed as raw data input per visitor to inference engine 112 running on PDS 109. Inference engine 112 infers the intent of each visitor based on the phrases and keywords of interests and the level of intent is determined by the amount of time spent on the keywords and phrases of interest. In one embodiment inference of intent is enhanced by determining the time spent on each phrase of interest (anchor text) relative to the cumulative time spent on all phrases of interest during the Web visit. History of visitor interaction with anchor text is leveraged to determine repetition patterns relative to interaction with anchor text to help fine tune the level of intent inferred by the inference engine. Buckets, which are divisions of content in a web page, and inverse page rank are used in some embodiments to calculate intent. These concepts are described in further detail below.

Referring now back to FIG. 1, monitor/data gatherer 111 may gather information about each visitor in addition to monitoring browser behavior. In one embodiment intent and level of intent of other visitors with a same or similar profile to a visitor being monitored is used to help infer the intent of the instant visitor. Such a profile might be determined by applying geo-location techniques on the IP addresses of the Web visitors where the profile data consists of zip code, city, state, country, metro code, company name, organization name, and visitor identity. Visitor identity might be determined from a form fill or by tracking a hyperlink sent to the visitor by email where the visitor clicked on the hyperlink.

Client Website 124 is analyzed to extract all of the content including the phrases of anchor text and all other text and images on the site. Each Web page of the site is tagged, as described above with the anchor text (keyword or phrase) that leads to the page. The intent tree is a tag tree representing the page hierarchy of the site and the time to spent on the root tag is equal to the time spent on any of the tags under the root tags in the structure. In a preferred embodiment monitor/data gatherer 111 tracks visitor interaction with other elements of each Web page navigated by the user besides the interaction, and non-interaction with anchor text on the pages. User mouse movements are tracked relative to highlighting, downloading, screen capture, and hovering over regular text and images on the Web pages. Monitor/data gatherer 111 tracks user activity and attempts to gather additional data where possible for each visitor that visits site 124.

Output from inference engine 112 consists of visitor intent, level of intent, and supporting data that allowed inference of intent of the visitor. The supporting data is organized as market intelligence data that accompanies the visitor specific data for each visitor that visited the Website. This output may be used by a data mining engine (not illustrated here) to further enhance the quality of each set of visitor data by correlating other information that may be acquired from third-party data sources. Such data sources may hold particular information about visitors that might not have been available to monitor/data gatherer 111. For example, if visitor identity and company affiliation is not determined during the Web visit, third-party databases that contain data about the visitors might be tapped to attempt to infer visitor identity, department, title, company, contact data, and any other missing element of the visitor profile. The value of the visitor information sets for each visitor rises with more information known about the visitor and the visit. In one embodiment the results of inference of intent of a visitor output by the inference engine might be further refined by mining additional data about the visitor that was not available at the time of the visit.

After all of the visitor data is aggregated for each visitor and intent is inferred including level of intent, the data may be packaged as a workable lead that may be presented to a buyer on the exchange such as entity 103 in this example. This task may be accomplished with a data packager and lead generator application 113 resident on and executable from the digital medium coupled to PDS 109. Data packager and lead generator 113 receives all of the visitor information sets that include the inferred intent and level of intent for each of the visitors. The application organizes the information according to a presentation model of an interactive lead capsule that may be priced and presented to potential buyers on the exchange such as buyer 103 of this example. As a buyer, entity 103 or individual account holders comprising sales people of the organization may set a variety of constraints or filters that indicate what types of leads they are willing to purchase over the exchange. Such constraints or filters are provided in the client application or plug-in that integrates the suite of the present invention with SFA application 117.

Data packager/lead generator 113 creates individual lead capsules or packages that may contain any number of leads where the leads packaged therein may be of varying quality in terms of the data available in each lead. Leads may be priced on average or priced individually within the capsule. In one embodiment a buyer may receive a capsule and then purchase individual leads or groups or clusters of leads presented within the capsule. A lead-purchase interface may be included within each lead capsule along with a search engine interface for searching out leads within the capsule by keyword, attribute, price, lead quality index, etc. Leads within a capsule may also depreciate with time and may be reduced in price as the lead ages with time.

A lead capsule database 110 is illustrated in this example and is connected to PDS 109. Lead capsule database 110 is adapted to store finished lead capsules, which are interactive navigable files that include several indexed information sections to aid buyers in convenient navigation of information ad eventual purchase of desired leads within the capsule. In one embodiment leads may be extracted in the form of a proactive campaign list where the buyer has purchased a cluster of leads presented within the lead capsule. The capsule may be enabled to generate several different types of reports relevant to market intelligence information.

In one embodiment buyer/seller 103 has a sellers account and sells leads from its Website to potential buyers on the exchange. In this case, Website 124 may be operated and owned by entity 103. In this case the seller 103 may have one or more filters that categorize which types of visitors to Website 124 should be included in leads "sold" on the exchange, and which types of visitors the entity may not want to sell as leads. A seller may decide to sell every lead that can be generated from visitors to the Website. For example, it is possible that a Website is not a sales site or commercial business but has a large number of visitors that could be interested in subjects, products, services, etc. that the Website educates or otherwise talks about. One example of this might be a technical blog by a technical author that rates different virtual machine packages sold by different companies, for example. Such a Website might install JSC 125 and have the visitors monitored for intent as they navigate various sections of the blog site.

Such leads then would be valuable to certain virtual machine software vendors and might be sold over the exchange to one or more of those vendors thus creating a steady revenue stream for the blog site in addition to advertising dollars. One advantage of this is that the blog site, typically of value to advertisers only if it has a lot of visibility, is now valuable if it attracts certain types of individuals that qualify as visitors having intent towards acquiring a virtual machine software package in this case.

In one embodiment of the present invention some or all leads within a lead capsule may be organized into distinct lead clusters or lead groups wherein the individual leads share one or more common attributes such as intent category and level, company profile, referring Web page, Web page exited to, income levels, products or services currently owned, and so on. For example, a lead capsule might contain a cluster of leads that share intent to purchase a computer and another cluster that share the intent to buy a computer service package for a computer they already own. These two different lead clusters may be packaged within a capsule that is sold on the exchange to a computer manufacturer that also offers a service package. Such clusters may be organized according to other criteria like region, similar contact data, or other criteria that may be identified as one or more filters that might be specified by potential buyers.

A cluster of leads that share a same geographic location intent on buying a house might be purchased by a real estate agent where all of the leads have an email account and a cell number. The agent may extract the list of those leads to a compatible, automated email send program that may be triggered to launch an automated proactive campaign to send all of those contacts a generic email listing current foreclosures in the area. A telephone dialer and message system might be used to automatically call each cell number as well alerting them of the important email about new foreclosures in the area. There are unlimited possibilities relative to lead generation, lead clustering, and lead extraction for proactive contact. Lead clusters exhibiting certain properties shared by all of the leads in the cluster may be linked to special email templates, telephone messages, SMS templates, and the like for expedient marketing while the leads are freshest.

In one embodiment, leads may be extracted and proactively engaged by assigning unique call in telephone numbers for the groups, sub-groups, or individual leads where the assigned call-in numbers are mapped to live sales agent queues or stations in certain sales/service departments in the company, or to remote agents working outside the company. In this case the numbers to call in may be sent in email, SMS, IM, or any other communication method so long as the leads include the appropriate contact data for receiving those messages. Hence, the messages may be quickly delivered to all leads in a cluster and sales agents may be placed in position to answer incoming calls from those leads that respond to the marketing message.

Referring now back to entity 103 as a buyer, individuals or the organization as a whole might download one or more lead capsules from PDS 109 for review. In one embodiment leads that are purchased from within a lead capsule downloaded may be extracted to a lead database 118 connected to APP server 116. Such leads may be distributed evenly among sales stations 120 (1-*n*) for agents to run their allotments of leads.

It is noted herein that high quality lead may be automatically generated in near real time from initial visits by visitors such as visitor 105 to client Websites such as Website 124, however it is a goal of service provider 102 to enhance the quality of those leads over time using data mining techniques to obtain additional information about each visitor such as offline activity data, affiliation data, past intent, purchase histories, lists of products and services purchased in the past, and any other information that might add value to the lead. Therefore, all of the applications involved in the overall process are linked together by extension or API to achieve continuity in the overall process and inference calculations may be automatically repeated for a lead when new data is obtained about the lead. The inference results may be reclassified for intent and or level of intent. Likewise cluster or group associations for leads may be managed such that one or more leads are shuffled between groups or isolated from a group or added to a group depending on subsequent analysis of new or changing data.

It is also noted herein that any new data relevant to leads already purchased may be automatically updated to a lead capsule by refreshing the lead capsule while online with service provider 102. For example, after a lead capsule is delivered and whether or not leads are purchased from the capsule, one or more of those visitors may log one or more new visits to Website 124 thus changing the outcome of inference of intent or necessitating lead re-assignment to a cluster or group within the capsule. If such changes bear on lead price, the pricing of those leads may also dynamically change within the capsule to become more valuable or to depreciate in value depending on the result. A 50 cent lead within a delivered capsule might be worth one dollar the day after the capsule was delivered to a potential buyer so an updating process may be ordered before any new lead purchases may be made using a purchasing interface provided within the capsule. In other words a purchase may be allowed only when online with provider 102 and after an update or refresh process is initiated to obtain the most current pricing.

Figure 2:
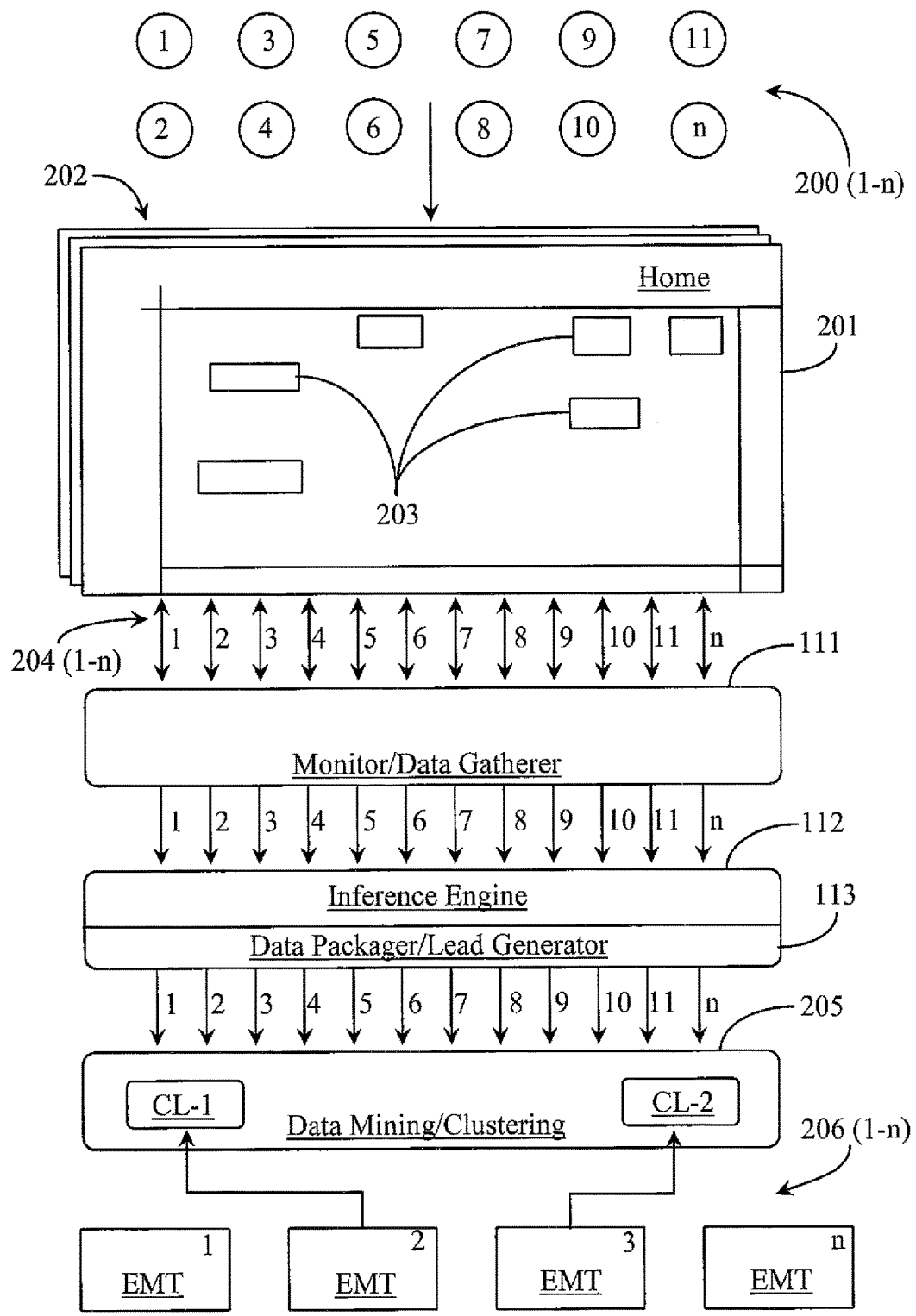
FIG. 2 is a block diagram illustrating components of an inference system according to an embodiment of the present invention.

FIG. 2 is a block diagram illustrating components of an inference system according to an embodiment of the present invention. A Website illustrated in this example has a start page or root page 201 and one or more Web pages 202 at least one of which is linked to from the root page. Visitors are illustrated herein as visitors 200 (1-*n*) that are detected visiting the site at the level of page 201.

Start page 201 contains several instances 203 of anchor text that lead to other pages 202 or to interactive offerings, presentations, or media as described further above. Each detected visitor 200 may interact with any one or more or none of the anchor text instances 203. Clicking on one of anchor text instances 203 initiates visitor browser navigation to the linked resource. Hovering on or right clicking an instance of anchor text 203 reveals information about the resource in an information bubble or the like. JSC enables recording of the visitor's mouse movements over the root page including any interaction with any of the anchor text instances 203.

Monitor/data gatherer 111 tracks the activity of each visitor 200 (1-*n*). This monitoring activity is logically illustrated herein by a plurality of visitor monitoring sessions 204 (1-*n*), each session given, in one embodiment, a unique session ID for tracking and data sorting purposes. The number of active visitor monitoring sessions is equal to the number of active visitors navigating the site. Sessions may appear and drop off according to the presence of those visitors on the site. There may be a minimum activity threshold or time threshold for a visitor to be classified as a potential lead. For instance, if a visitor logs on and then immediately logs off of the Website the data gathered might be ignored for that visitor if there is not enough activity or additional data to infer intent of that visitor.

Monitor/data gatherer 111 will continue to track each visitor for the total amount of time that the visitor is actively navigating the Website. This time period lasts from the instant the visitor is detected and a monitoring session is created for that visitor until the visitor exits or otherwise drops off of the page. If a visitor logs on to the page and a monitoring session is created but no mouse movements or navigation is detected for a threshold period of time, that visitor session may be terminated and the visitor may be passed over for intent inference. After monitor/data gatherer 111 detect that the visitor has exited the site, the application attempts to determine which page if any the visitor exited to. A link to an exit page might contain anchor text that described the exit page. In one embodiment a tracking cookie can provide the URL of the exit page and data mining may later determine the content of the page exited to from the site.

After a monitoring session is determined complete for a Web visit for a visitor (from site log on to site exit), the raw data about the visitor and the visit in passed to inference engine 112 for that visitor. The unique session ID assigned to the monitoring session may be retained to server as a unique identifier for the data relevant to the session and visitor. Inference engine 112 accepts the data input and primarily maps the visitor activity relevant to the anchor text interactions that occurred during the session to a hierarchical tag tree representing the Website structure in terms of the locations of each anchor text instance interacted with on the site. Inference engine 112 may run several additional algorithms that are designed to help with determination of intent of the visitor at least during the Website monitoring session of the visitor.

Determining and Quantifying Visitor Intent

In practice of the invention, the intent of a visit can be determined based on . . . .

(1) The search terms used in the referrer website (such as search engine) prior to landing on the root page.
(2) The set of tags associated with each page visited in that session.

The tags as mentioned previously are determined based on the anchor text associated with certain links. While the tags determine the intent of the user, they do not help in automatic classification between a "curious" visitor and an "interested" visitor (level of intent). One factor which differentiates the two users is the time spent on the webpage, since any page requires the user to spend a certain amount of time in reading and assimilating the content on it. The Intent of the visitor in a particular session is determined by a set of tuples, each comprising a tag and the time spent on a page with that tag, for all the pages visited in the Web session. The time spent can either be the time spent on the page or could be made more accurate by determining the "useful" time spent on the page.

The useful time spent on the page can be determined based on activity carried out on the page (which will eliminate false positives which may result on account of the page being kept open in a browser). Yet another differentiating factor between these two types of visitors is the "single-mindedness" of intent. A curious visitor, contrary to the interested visitor, does not typically show single-mindedness and does not seek in-depth knowledge. Unless the specific page visited is reached directly from a referrer website, the visitor goes through a series of links, before hitting upon the desired page. The deeper the user traverses in the graph, greater the focus of the visit. The deeper pages in the web site hierarchy have a lower page rank (computed on the website graph and not the globally published page rank, by Google™ Inc.). Therefore, the reciprocal of the page rank indicates a higher interest level.

In actual practice, the visitor's intent can be quantified by a function $$h\left(h_1(\text{time spent}), h_2\left(\frac{1}{\text{Page's Rank}}\right)\right)$$

where $h \propto h_1(\text{time spent})$ and $$h \propto h_2\left(\frac{1}{\text{Page's Rank}}\right)$$

$h_1$ can take any form which shows direct proportionality viz. linear function or a step function, etc. Similarly $h_2$ can take any form which captures the inverse proportionality with h. The above score computed based on the time and page rank is referred to by the inventor as a "Gauge Score" or G-score.

During any visit, since the visitor will (in all probability) traverse more than one link of the Website, there is a need to order those pages. The G-score is computed for all of the pages visited. The pages can be sorted based on the G-score computed for all the pages. Further, a single intent can be determined by removing all other nodes, which are the predecessors of the node with the highest score in the spanning tree T (which is the tag tree—the construction of which is explained subsequently.). However, the deepest node in the hierarchy may not always clearly represent the intent of the user. For example, a person visits a Web page pertaining to "Macbooks™" and then the deepest visited may be page pertaining to the specification of the Macbook™.

While the specifications page may be at the deepest level and hence has the highest inverse page rank, it does not capture the intent—Macbook. So in such cases, the immediate parent node needs to be considered as the primary intent. This can be determined using either the search keyword(s) obtained from the referrer site or from the list of nodes visited during that session. Further, the ordering of the results can be used to get customized views by filtering the nodes by the bucket to which they belong. Buckets are sections into which a website can be divided based on the intent of the visitor, for example, Products, Solutions, and Services, all sections that relate to items that a company might sell. The bucket under which a node lies is determined from the spanning tree. Alternately, The G-Score is further enhanced by using the bucket weight of the node, w(h, b), where w is the weight function, h is the G-score and b is the bucket weight. Each bucket weight is assigned a weight based on its relative importance. If the node has been classified incorrectly by the spanning tree algorithm, it may be reassigned to a different subtree based on manual input. Furthermore, the tag and the G-score for each session from the same organization may be aggregated to obtain an overall score for the organization's interest relative to an intent classification. Moreover, the overall G-score of each visit may be additionally weighted based on the designation of the visitor. The higher the designation the greater is the weight.

In summary of the above description, determination of intent of the visitor may be inferred from search string of referrer or from the tags of the pages visited. The tags, in preferred embodiments of the invention, are obtained from the anchor text of the link. Visitors are sorted automatically based on intent quantification (intent level) computed using any of or all of the following . . .

(a) Time spent including "useful" time spent on the page.
(b) The depth of the page in the website hierarchy. It is noted herein that the "depth" of page refers to a method to indicate its accessibility from the root. The depth of a tree can be measured via several methods, one of which includes the page rank computed on the graph.
(c) Ordering the pages visited based on G-Score.
(d) Using the tags of the predecessor nodes in the spanning tree to qualify the intent with the intent of avoiding potentially ambiguous intents.
(e) Displaying customized views of visits based on the buckets to which the nodes belong.
(f) Allowing manual movement of nodes from one subtree to another subtree of the spanning tree of the graph. This flexibility is ordered in case the heuristic generating the spanning tree incorrectly associates a node to a wrong subtree.
(g) Aggregating the G-Scores across several visits from the same organization to present organization based results where the visit from a certain organization is determined based on IP address, etc.
(h) Weighting the G-score with designation of the visitor, where the designation of the visitor is determined using form fill, etc.

It is noted herein that the above sequence may represent one or more methods for determining accurate intent of a visitor to a monitored Website wherein the steps thus disclosed above may be followed in or out of order of listing and wherein some or all of the steps are practiced in such a method, and which method shall not require illustrative support if claimed herein in this specification.

With reference to activity interacting with anchor text, the inference engine takes into account the instances of anchor text 203 hovered on or clicked on by the visitor, where the anchor can be a text hyperlink or a multimedia hyperlink. Examples of multimedia hyperlinks may be an image hyperlink or a flash object hyperlink.

The inference engine, in the case of a text hyperlink, may infer intent of a visitor in a number of ways. In the case of anchor text, the text strings themselves may be analyzed semantically, using a variety of information sources, some of which may be local, and others of which may be remote. It is clear that a visitor, interacting with anchor text, is in high probability motivated (his or her intent) by the meaning of the words of the text. So an important part of determining the intent of the visitor is in the meaning of the text, words in the text, or related words and phrases to the text. In some cases the intent may be deduced just by this semantic means alone. In some cases the inference may also take into account syntax, that is, the placement and the way that words may be used in a phrase. Further, inference may be made by the behavior of a visitor relative to anchor text, such as the number of times and the frequency with which the visitor might return to a particular anchor, time hovering over a particular text without invoking the link, and so on. So inference in embodiments of the invention may be through any one of, or any combination of semantic, syntactic or statistical means.

The inference engine in some embodiments, as mentioned just above, takes into account the length of time that the visitor hovered on the anchor text. The inference engine also takes into account the length of time spent by the visitor on the page resulting from clicking on the hyperlink associated with the anchor text to navigate to one of pages 202. This is the URL that the visitor navigates to by clicking on the hyperlink associated with the anchor text. The inference engine further accounts for the number of times that the visitor hovered on or clicked on each anchor text and the sequence or order of hovering on or clicking on the anchor text.

With respect to other text on the Website besides anchor text, the inference engine receives data from monitor/data gatherer 111 relative to visitor activity with those instances of text. For example the monitor/data gatherer observes and records the behavior of the visitor related to highlighting of text on the Website including root page 201 and any subsequent pages 202. The inference engine may take into account the text highlighted by the visitor using the mouse or the keyboard. The inference engine may take into account the length of time the text was highlighted including the length of time spent by the mouse pointer on and around the highlighted text. The inference engine accounts for the number of times the text was highlighted and the sequence or order of highlighting the text during the visit.

The output of inference engine 112 may be input into data packager/lead generator 113 described and illustrated with reference to FIG. 1. The output of data packager/lead generator 113 is logically assumed to be qualified leads that may be included in a lead capsule. The generated leads include all of the information about the visit and visitor including all of the phrases and keywords of interest along with a classified intent and a level of the intensity of the intent of the visitor. A data mining/lead clustering engine 205 may be provided for the purpose of developing the quality of leads further and to cluster leads based on one or more shared attributes like the same level of a classified intent and same geographic region, or same intent classification and same company affiliation, etc.

As described further above, every Website has a tree structure. The home page is the root and the anchor text on the home page would be the first branch level nodes of the tag hierarchy, for example products, solutions, careers, and so on. The structure of the Website is thoroughly analyzed and all the subsequent Web pages 202 are tagged with the anchor text leading to those pages. In this way the tags reveal the base intent of the visitor. The hierarchy of Web pages translates to a hierarchy of "tags". The amount of time spent by a visitor on a "tag" is equal to the amount of time spent on all the "tags" in the sub tree under that "tag". Intent of a visitor is a function of a few basic parameters, those being, the tags associated with the visit, the time associated with each tag, and the path traversed by the visitor in the tree.

In this example data mining/clustering engine 205 looks for additional data that can be added to leads to boost the value of those leads and groups certain leads together via a clustering application to form lead clusters containing a plurality of individual leads that are alike in some important way from the perspective of the lead buyer. A buyer may create filters that pertain to lead clustering in addition to filters for screening out leads that the buyer is not interested in.

It is noted herein that data mining and lead clustering may be separate applications without departing from the spirit and scope of the present invention. Moreover, all of the applications thus far described might be provided as one integrated application or multiple separate applications some of which may be distributed to other machines. In one embodiment data mining and lead clustering occurs before data packaging and lead generation where the lead capsule is concerned.

In this example the leads generated are grouped one by one into clusters CL-1 and CL-2 for a potential buyer. Proactive contact may be by telephone or by any other contact data provided with each lead. In this example the buyer may have specified that all of the leads within lead cluster 1 and within lead cluster 2 have email accounts and a working email address. Clusters may be managed on a periodic basis. In this embodiment there is a plurality of pre-established email templates 206 (1-*n*). Each email templates 206 (1-*n*) may be maintained by the buyer of lead clusters CL-1 and CL-2. The clustering engine can generate lead clusters under specific parameters such that one of the predesigned email templates specifically solicits the leads in a cluster based on the intent of the leads. In one embodiment the service provider may provide templates that are based on the intent specific to products or services and matches the best template to a lead cluster such that when the leads are extracted from the cluster into an email list, the template automatically executes as the email that will be sent to all of those leads proactively.

Figure 3:
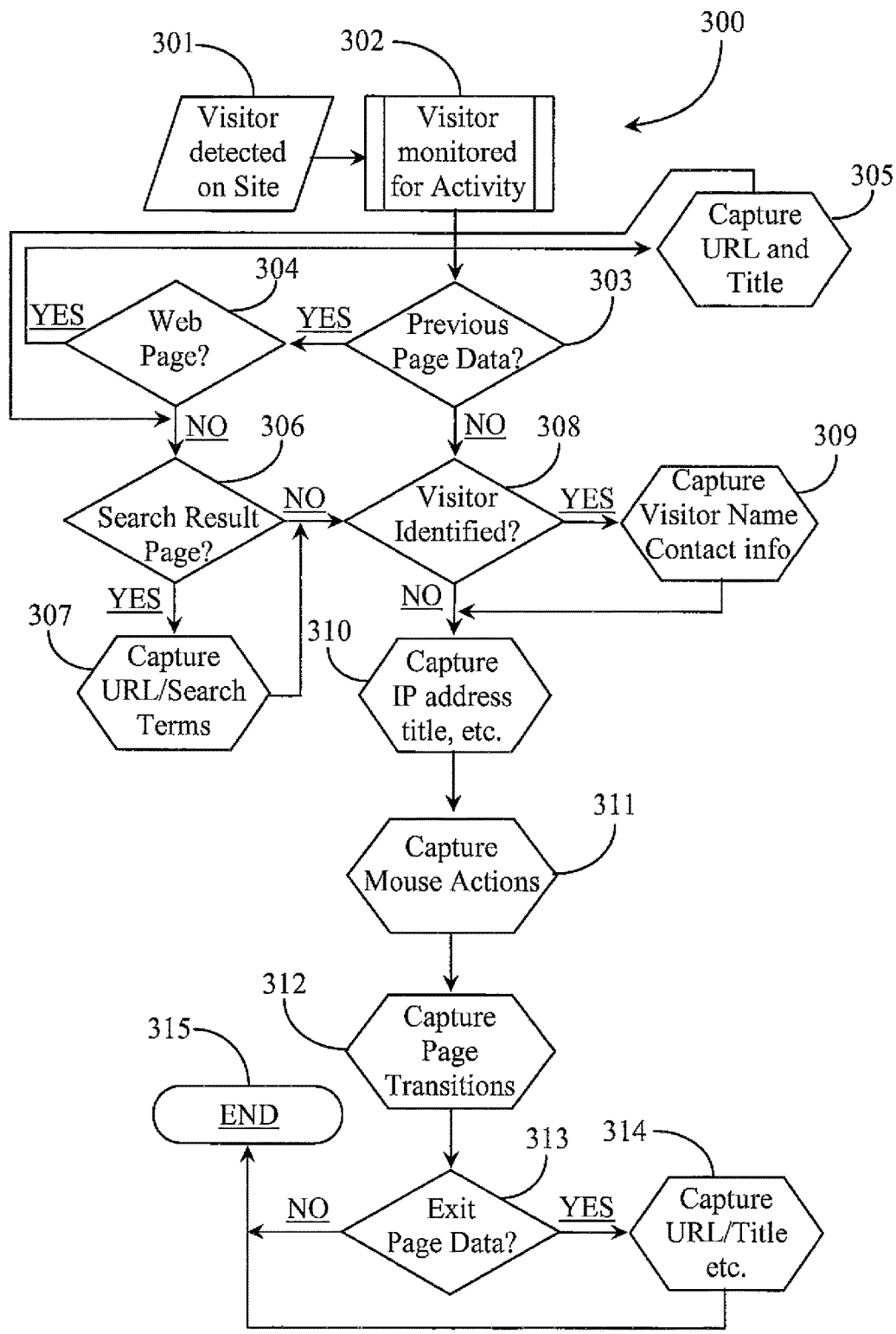
FIG. 3 is a process flow chart illustrating steps for monitoring a Web visitor and gathering data about the visitor and visit according to an embodiment of the present invention.

FIG. 3 is a process flow chart illustrating steps 300 for monitoring a Web visitor and gathering data about the visitor and visit according to an embodiment of the present invention. At step 301, a visitor is detected on a Website adapted for visitor monitoring. At step 302 the visitor is monitored for activity. At step 303 the monitoring system may determine if there is any previous page data available. An example might be that the visitor entered the site from a referral page. The data gatherer application might have access to this data through a tracking cookie or through browser history data.

If there is data available about a previous page from whence the visitor came onto the Website at step 303, then at step 304 the monitoring/data gathering system determines if it was a standard Web page from another Website. If the system determined that it was a standard Web page, then at step 305 the data gatherer captures the URL and title of that previous Web page the visitor was on before entering the Website and being subject to monitoring. If at step 303 the system determined that there was previous page data available and at step 304 the system determined that it was not a standard Web page, the system determines at step 306 if the previous data was from a search result page. If the system determined that the previous page was a search engine results page, then the data gatherer captures the URL and search terms used in the search that listed the current Website in the results.

If at step 303 there was no previous page data, the system determines if the visitor is identified without ambiguity at step 308. If the visitor identification is available at step 308, the data gatherer captures the visitor name and contact information if available at step 309. Back at step 306 if the page data cannot be identified as a Web page or search results page the process may move directly to step 308. If at step 308 the system cannot identify the visitor without ambiguity, the data gatherer captures IP address, title of the visitor, and any other available data about the visitor that might help later to obtain the name of the visitor at step 310.

At step 311 the monitor application tracks all of the movements of the visitor throughout the Website. The monitor also captures all of the page transitions from one Web page of the Website to another Web page of the Website at step 311. The movements tracked include all of the mouse and keyboard actions perpetrated by the visitor while at the Website. The page transitions amount to the anchor text "tags" leading to those pages. In steps 311 and 312, the system also records the time spent in each interaction and the total time spent on each page of the Website.

At step 313 the system determines if there is any exit page data available. The exit page data referred to would be data from a Web page exited to from the Website wherein the page is not formally part of the Website and wherein the page is navigated to by clicking on anchor text in a page of the current Website. An exit page is tagged by an anchor text directing the visitor to that page. Therefore exit page data is available if the visitor exits the Website to that page referenced in the anchor text associated with the hyperlink to the page. If there is exit page data at step 313 the system captures the URL and title of the page at step 314. The process then ends for that visitor at step 315. If there is no exit page data available at step 313 them the process ends at step 315 for that visitor. In this example, much of the data captured at steps 305, 307, 309, and 310 may be used as input to search other sources for more information about the visitor. For example if the visitor cannot be identified without ambiguity at step 308 then the data captured at step 310 will later be used to try to determine the visitors identity through other methods including offline research if necessary.

Figure 4:
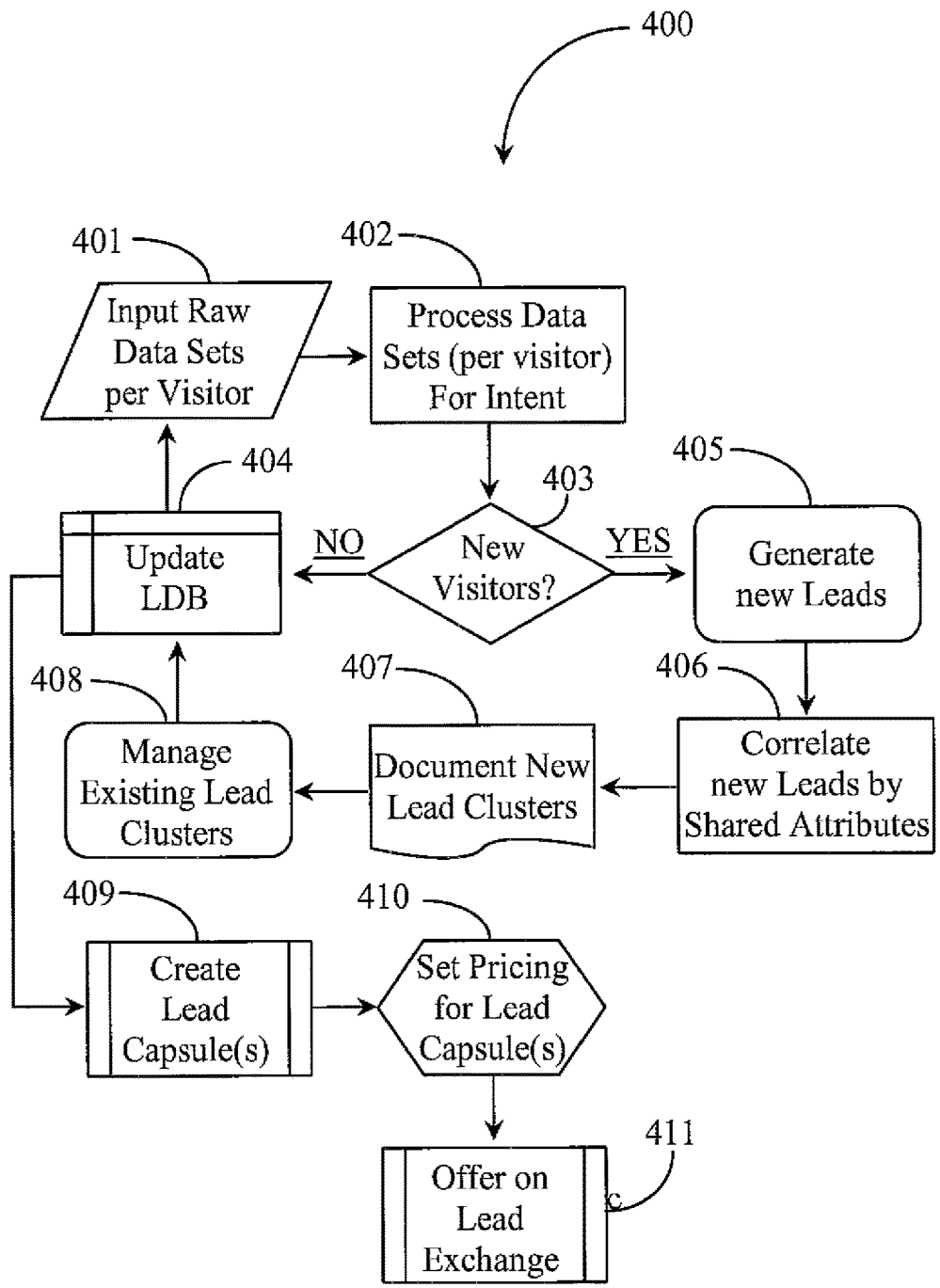
FIG. 4 is a process flow chart illustrating steps for generating leads and packaging the leads into one or more lead capsules according to an embodiment of the present invention.

FIG. 4 is a process flow chart illustrating steps 400 for generating leads and packaging the leads into one or more lead capsules according to an embodiment of the present invention. Steps 400 illustrate a process that may be an extension of the process of FIG. 3 above. At step 401 the raw data sets and data found during look up operations if performed is sent to an inference engine analogous to the inference engine of FIG. 2 to determine intent of each visitor. At step 402 the inference engine processes each data to infer intent of the visitors. This step is performed after monitoring and data capture tasks are completed for the visitors. In one aspect the inference engine may be enabled to determine if visitor data sets input into the engine are those of new and fresh visitors or customers who have come back to the Website after already being processed as a lead. At step 403 the system makes a determination of whether there are any new visitors to the site.

If there were no new or fresh visitors detected in step 403, the system may update a lead database (LDB) at step 404 with any new data discovered about the existing leads. Such data may affect the intent classification or intent level of a lead, the cluster assignment for the lead or other attributes of the lead such as pricing for the lead. If at step 403 there are fresh visitors detected, the lead generator generates new leads from those visitor data sets at step 405. At step 406 these new leads may be correlated with one another to form one or more new lead clusters at step 407 based on shared attributes of the generated leads. In one aspect the new leads are added to existing lead clusters based on similar attributes rather than forming many new lead clusters. Having too many narrowly defined lead clusters is not desirable. Forming a few lead clusters that remain relevant to the proactive designs of a buyer enterprise is more desirable.

At step 408 the system continues to manage existing lead clusters and the process moves to step 404 where the lead database is updated. At step 409 one or more new lead capsules may be created. At step 410 the system may set initial pricing for the newer leads. At step 411, those lead packages are offered over the Internet on the lead exchange.

In one embodiment old leads are updated with new information if possible as a result of a recent visit or visits to monitored Websites. In one embodiment after a threshold period of time, old leads may be re-packaged as new leads if intent for other services products, etc is discovered. A visitor may frequent a number of different Websites that are monitored by the service provider making leads available on the exchange. In this regard a same visitor may be packaged as a number of different leads having different intent classifications based on the content visited and thus the visitor data may be purchased as a lead by widely different buyers whose products and services matched the intent of the lead.

Figure 5:
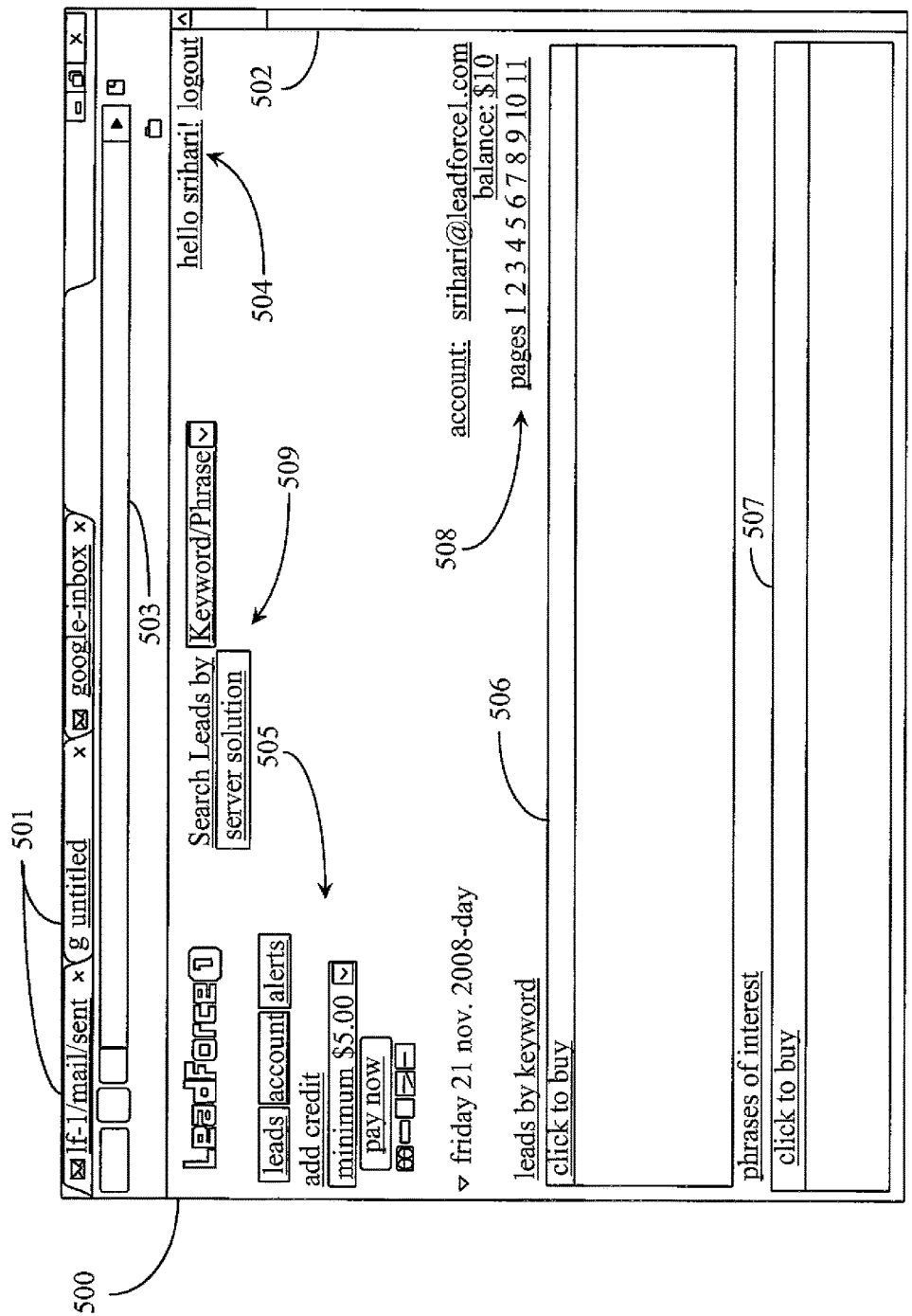
FIG. 5 is an exemplary screen shot of a lead capsule interface of an interactive lead capsule according to an embodiment of the present invention.

FIG. 5 is an exemplary screen shot of a lead capsule interface 500 of an interactive lead capsule according to an embodiment of the present invention. Interface 500 is a browser-based interface used for reviewing a lead capsule and for purchasing leads presented within the lead capsule. Interface 500 includes browser tabs 501, a scroll bar 502, and a navigation field 503. Familiar browser options menus and icons may be assumed present in interface 500. A lead capsule may be navigated by any browser application and all of the pages within a lead capsule may be hypertext markup language (HTML) pages or of a similar markup. Lead capsules may be reviewed remotely by potential buyers or they may be downloaded and reviewed offline. In a preferred embodiment some of the attributes of leads such as contact data and the like are not visible until the lead has been purchased.

Within the workspace of interface 500 a welcome statement and logout option 504 is illustrated. A lead capsule may require authentication for review and purchase of leads. In this example a potential buyer may be required to become a registered member of the lead exchange and may be required to authenticate in order to review a lead capsule. A set of purchasing options 505 is presented for potential buyers to buy leads from within the capsule. In one embodiment a potential buyer may access any lead capsule and purchase leads if the capsule is not exclusively owned by another buyer. In one embodiment a buyer may purchase some or all of the leads within a lead capsule at a price that is an exclusive price in which case the capsule would not be available to others. In another embodiment leads within a lead capsule may be purchased by more than one buyer at a non-exclusive price. There may be discounts given for numbers of leads purchased.

Options 505 include a leads button that enables the potential buyer to browse leads for purchase. An account button enables the user to view his or her account status. An alert button enables a user to set alerts when leads of a particular category or type become available on the exchange. An interface is available for the buyer to add credit to his or her account for purchasing leads. Payment options may include pre-pay options, credit card options, PayPal™, and online check. A potential buyer may put money in a special account that is drawn upon when leads are purchased through the interface. There may be a minimum balance or purchase amount that is imposed on buyers that purchase leads through the interface.

A lead presentation window 506 is illustrated in this example and is adapted to list interactive leads as search results. A lead search interface 509 is provided as a drop-down menu containing a list of search options for searching for leads within the lead capsule. A keyword hypertext listing pointing to a lead will be descriptive of the intent of the visitor of the lead. A page listing interface 508 shows the number of pages of leads available in the capsule that match the search criteria input into search interface 509. Any listed lead within window 506 may be reviewed by clicking on the lead anchor text and reviewing the lead data in a separate window. A lead that is not purchased will have some blank fields such as blank contact data fields that will be visible to the buyer only after the lead has been purchased. In one embodiment lead groups or clusters may be listed by keyword, phrase, or other search term. A potential buyer may click on a group to expand the list of leads belonging to that group. A group of leads may be purchased by double clicking the lead group or cluster keyword, which should reveal the intent of all of the visitors of the leads for that group.

A second lead presentation window 507 lists all of the leads in the capsule by the phrases of interest for each lead. Leads may be listed by common phrase of interest in a search. Leads may be listed by region, country, city, company affiliation, and many other lead parameters. In window 507 leads are listed by the phrases of interest for those leads. Each phrase of interest speaks to the intent of the visitor of the lead. In one embodiment the time spent on each phrase of interest is listed along with the phrase using anchor text that points to the lead and all of the lead data available. In one embodiment leads may be listed by price range. Higher priced leads may be listed first followed by leads of mid-range pricing, followed by low priced leads. Leads may be sorted by the date of generation. Each lead may have a unique ID number so leads may be tracked and updated. Each lead listed in windows 506 and 507 can be interacted with to view lead data associated with the lead. A lead presented within interface 500 may have associated with it much of the raw data that was used to classify intent, and price the lead. This raw data may be organized into sections for each lead.

Figure 6:
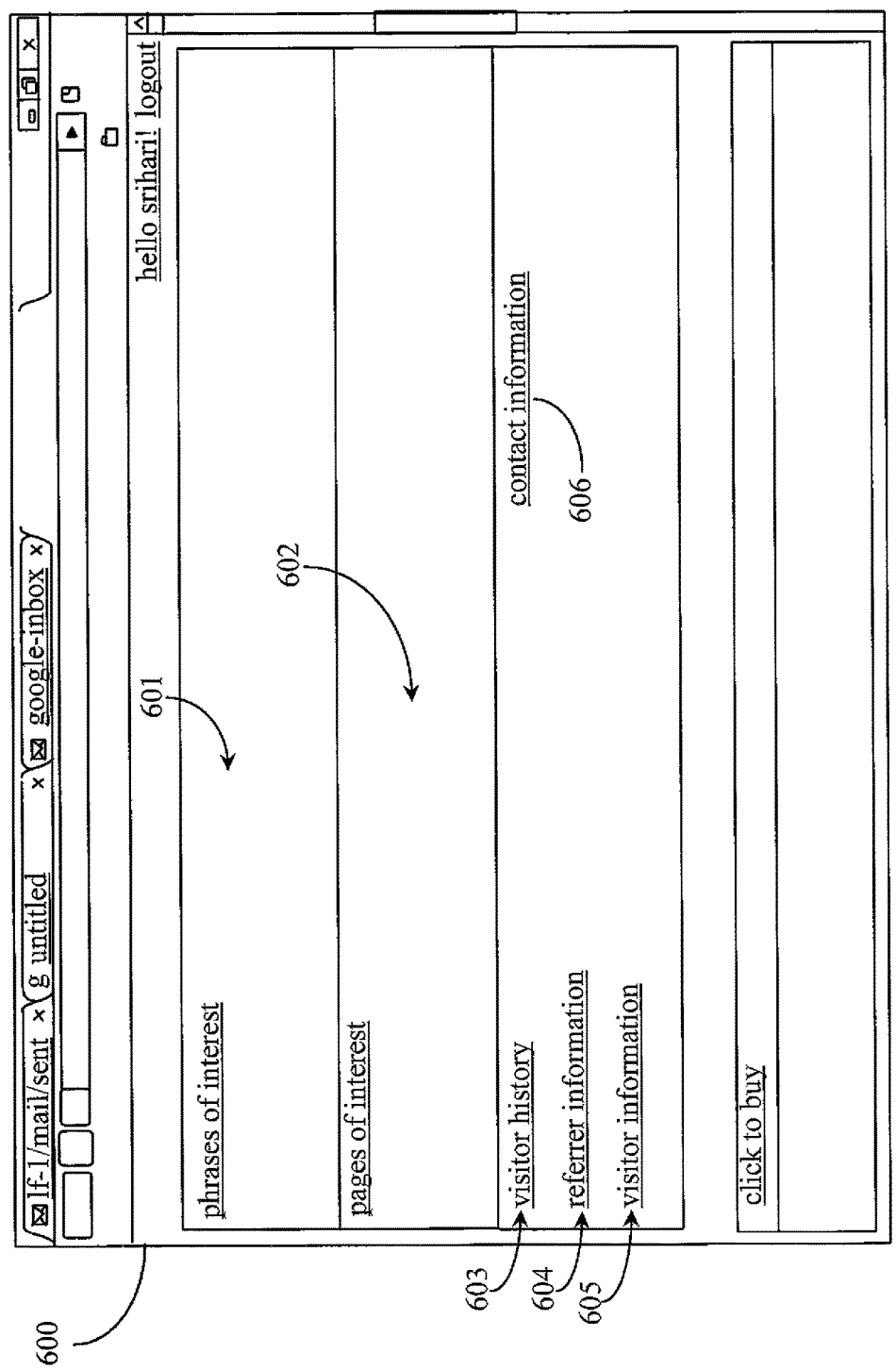
FIG. 6 is an exemplary screen shot of an additional page of the interactive lead capsule according to an embodiment of the present invention.

FIG. 6 is an exemplary screen shot of an additional page 600 of the interactive lead capsule according to an embodiment of the present invention. Browser-based page 600 includes a window 601 listing leads by the phrases of interest captured for each lead. A window 602 is illustrated that lists leads by the pages of interest to the visitors of the leads when they were most recently navigating the Website. A page or pages of interest may be a Web page of a Website that the visitor spent more time on in comparison with other pages of the site. It is noted herein that the total time spent on a phrase of interest or page of interest may be included in the listing.

Page 600 includes several lead data viewing options. A viewing option 603 is provided for viewing visitor history including browsing history, purchasing history, and other history data discovered about the visitor. This information may be non-accessible until the lead has been purchased. A viewing option 604 enables a potential buyer to view information associated with a referring page or article that the visitor viewed or read that referred the visitor to the Website from which the lead was generated. This information may also include URL, title, keywords, search terms, text content, download and/or upload information, and anchor text clicked on that directed the visitor to the Website from which the lead was generated.

A viewing option 605 is provided for the potential buyer to view visitor information, which may include visitor company affiliation, visitor profiles, visitor online associations, and any other incidental information about the visitor that was discovered. Some or all of this information may be withheld until the lead has been purchased. For example, contact data would not be available unless the lead was purchased. Another viewing option 606 enables a buyer who has purchased the lead to view the contact information of the visitor. In one embodiment further options are provided for viewing lead cluster statistics and information such as what shared attributes compelled the system to form the cluster. Ideally, clustering is performed to aggregate like leads for a buyer that has indicated criteria (filter(s)) for purchasing leads. A lead capsule may be generated that contains leads developed from many different Websites monitored by the service provider. Lead clustering may be performed based on knowledge from potential lead buyers that are looking for particular classifications of intent.

A lead capsule may contain many leads of different types generated at different times over a plurality of monitored Websites. On the other hand, a lead capsule may contain leads that were generated from a single monitored Website. Buyers of lead capsules may be allowed to share leads contained within the lead capsules. Clusters or groups of related leads may be presented within a lead capsule. Lead capsules may also be clustered based on shared attributes of the leads contained within each lead capsule.

Figure 7:
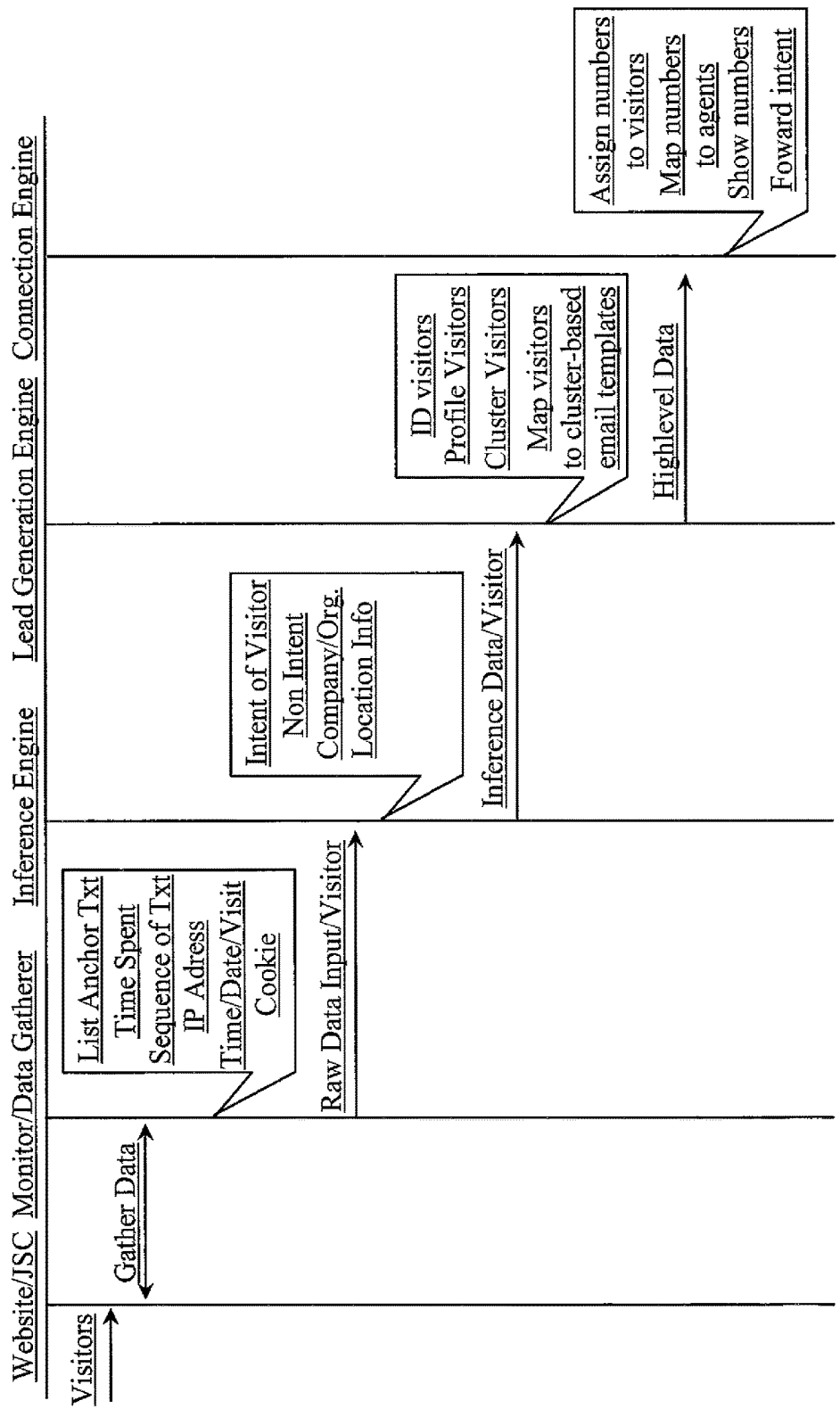
FIG. 7 is an interaction sequence chart illustrating tasks for connecting visitors to agents based on inferred data about the visitors and the visits to a Website.

FIG. 7 is an interaction sequence chart illustrating tasks for connecting visitors to agents based on inferred data about the visitors and the visits to a Website. Visitors are detected on a monitored Website with JSC installed to enable visitor monitoring and data gathering. A monitor/data gatherer monitors visitor activity for each visitor and gathers data where available about each visitor. Each visitor is monitored from time of detection of the visitor on the site until the time the visitor leaves the site. The monitor/data gatherer records the visitor activity related to anchor text on the Website, time spent on pages of the Website and time spent interacting with portions of the Website. The sequence of interaction with anchor text instances is recorded for each visitor. The IP address information is logged for each visitor. The time and date of each visit is recorded for each visitor, and a tracking cookie may be sent to each visitor appliance so that activity away from the site might be discovered during subsequent visits to the site. Other types of visitor activities in addition to the types listed herein may be performed at the site such as text or image download or upload content monitoring, screen capture activity monitoring, site search activity monitoring, form fill activity monitoring, and tag creation activity monitoring.

The monitor/data gatherer forwards the raw data per visitor to an inference engine adapted to infer the intent of each visitor based on the activity data, especially activity relative to interaction with anchor text on the site. When the inference engine receive the raw data input is analyzes the input to determine intent of the visitor and non-intent of the visitor. The data gatherer attempts to gather data about the visitor like the company or organization the visitor is affiliated with and the geo-location of the visitor. The data gatherer may gather identification information about the visitor, the contact information of the visitor, and any other information that is available to the gatherer during the visit.

The output of the inference engine includes intent of the visitor, phrases, buckets and keywords of interest to the visitor and all of the associated data recorded that was used by the inference engine to help classify the intent of the visitor and the level of intent where possible. Some information may not be available at the time that a visitor visits the Website. Therefore, all of the previous data and the output from the inference engine are forwarded to a lead generation engine adapted to generate leads and to group leads into clusters based on shared attributes. The lead generation process may include data mining and further lead development including updated intent classification or intent level.

A data mining engine may utilize any of the data gathered during the visit by the visitor to lookup additional data from external and third-party data sources. For example, the data miner may attempt to discover ID (identification without ambiguity) or at least narrow the visitor's possible ID to a few possible contacts for which the contact data would be provided (identification with ambiguity). The lead generation engine is responsible for packaging lead data into a lead capsule or sales information capsule. In this regard the visitors are identified without ambiguity if possible. If not possible then visitors are identified with ambiguity meaning that the identification may point to more than one possible contact such as one of a number of persons that belong to a group that was identified without ambiguity.

Visitors may be profiled and clustered based on shared attributes. For example, a cluster or group of visitors may be a group sharing a same intent classification. A cluster or group of visitors may be those who have a same company affiliation. In one embodiment the visitor or lead clusters are mapped to an appropriate pre-designed proactive email template. For example, if a cluster of leads shares the attribute intent to buy a computer, then that cluster would be mapped to an email template that offers the visitor a computer as opposed to one that might offer the customer a server. A proactive campaign using email may be launched automatically at the moment a cluster is associated with the correct email template.

After generating leads and further developing the quality of those leads, high level lead data may be forwarded to a telephone connection engine. In this case call-in telephone numbers may be assigned to every lead in a cluster of leads and those telephone numbers may be sent out to those visitors via the pre-designed email template that solicits those potential customers to call in to get a discount on a product or service, for example. The connection engine may map the assigned call-in numbers to live agent extensions in a manner that would distribute workload evenly during an influx of generated inbound calls for a sale group that is much smaller than the amount of leads in the cluster.

All of the steps described above may be performed without manual human intervention during the process. In another embodiment a lead cluster can be extracted to the form of an outbound calling list where a machine automatically calls each lead in the cluster and makes an offer to the customers that answer the calls. Accepted offers are then routed to available personnel. The system may also forward the lead data including intent and intent level to any live operator that is talking a call from the subject of the lead. If a lead is identified with ambiguity and several contacts are associated with the lead as possible subjects of the lead then all of those contacts may be solicited proactively where the contact data is available.

In this example, leads are generated and packaged for distribution with automated proactive means for contacting those leads included in the packaging. In other embodiments buyers make their own decisions about how best to process the leads they purchase. It is noted herein that leads may be continually updated wherein new lead data discovered may be added to the lead and obsolete lead data may be purged. Leads may be reclassified for intent, level of intent, and they may be reassigned to a different cluster or to no cluster depending on latest information available about the subject to the lead.

For example, consider a visitor visited a Website 1 week ago and inferred intent was that the visitor wanted a packaging service for products the visitor is manufacturing. Now consider that the same visitor visits another monitored Website looking for packaging materials for packaging products for shipment. The latter intent may serve as evidence that the visitor decided to personally package the products without using a packaging service. If this lead from one week ago is listed in a cluster of leads in a lead capsule, refresh of the capsule while connected to the service provider may result in update of new information about the lead, which will change the intent classification of the lead and would change the cluster assignment of the lead if the shared parameter was "looking for a packaging service". Pricing of the lead may drop if the refresh occurs in a capsule that is owned by a company that only sells the packaging service but not the packaging.

Figure 8:
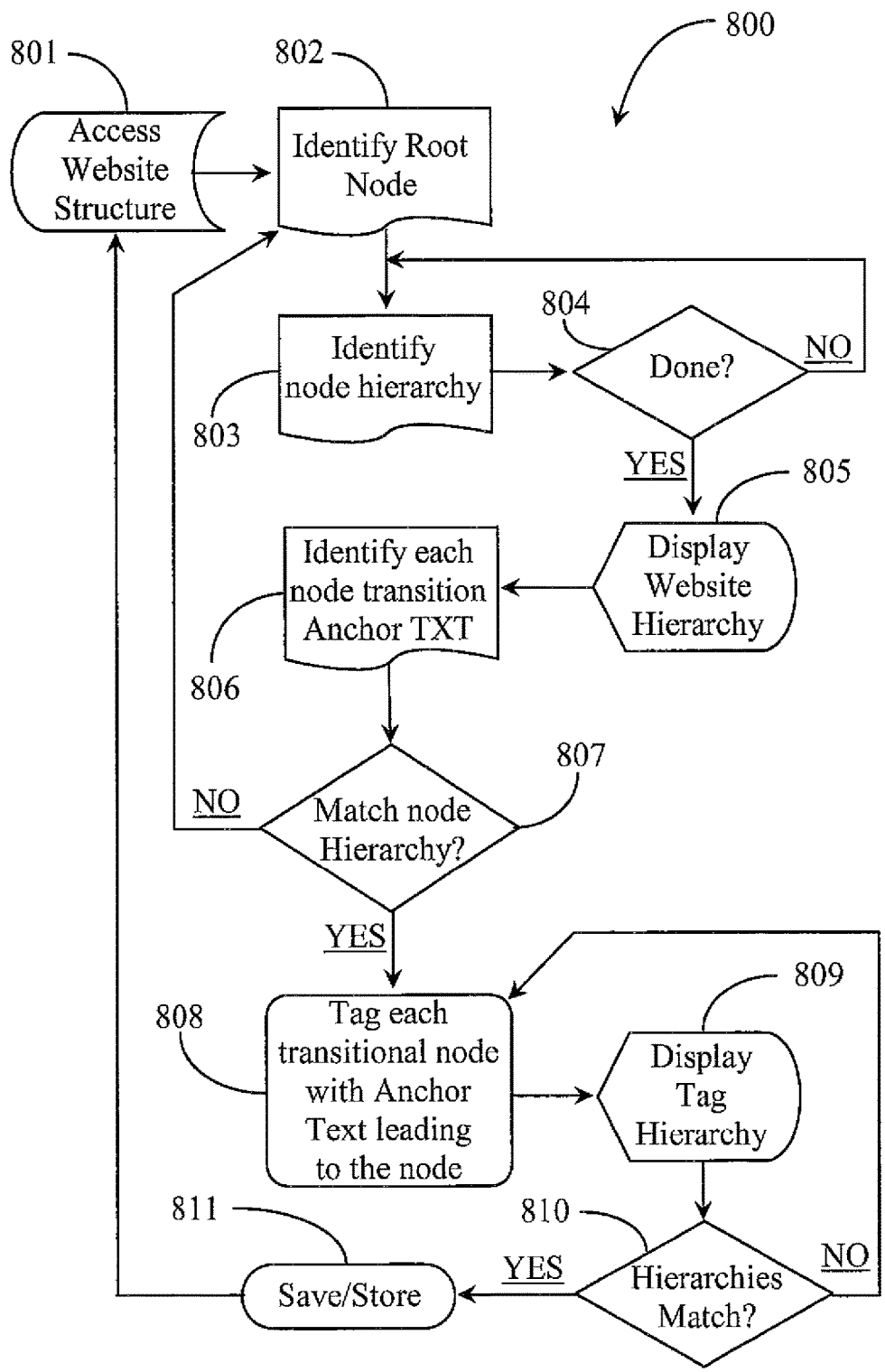
FIG. 8 is a process flow diagram illustrating steps for tagging Web pages and generating a tag hierarchy of anchor text phrases according to an embodiment of the present invention.

FIG. 8 is a process flow diagram illustrating steps 800 for tagging Web pages and generating a tag hierarchy of anchor text phrases according to an embodiment of the present invention. At step 801 the system (automated), or a knowledge worker (manual) accesses a monitored Website structure for analysis. At step 802 the system identifies the root node or the main start page of the Website. At step 803 the system identifies the node (page) hierarchy of the Website starting with the root page on down the tree. At step 804 the system determines if the entire tree structure is identified. If the analysis is not complete at step 804, then the process may loop back to step 802 until all of the nodes in the tree are correctly identified in the tree structure.

When the entire Web tree (hierarchy) is correctly identified it may be displayed at step 805. At step 806 the system identifies each instance of node transition anchor text in the tree structure. The transitional anchor text is the anchor text visible to the user associated with the hyperlinks located in the first node and subsequent nodes on down the tree that lead to other nodes down the tree structure from the beginning node. It is noted herein that anchor text may also lead to a multimedia presentation, an image, a form, or some other Web interactive supported by browser navigation. That is to say that each node is a resource located by executing hyperlink containing a URL and/or a URI. The visible part of the hyperlink is the anchor text that is a keyword or phrase.

At step 807 the system validates the work by re-checking to see if the identified hyperlinks share the same tree structure as the identified nodes in the Web structure. For example, the instances of anchor text located in the start page or beginning node of the Web structure are all first level nodes in a top branch, all of them leading to one or more second level resources. In an example consider the anchor text instances "products", "solutions", "careers", "partners", "about us", "sign up for new product alerts", "watch a demo", "download drivers", etc. to be keywords and phrases of user intent. These keywords and phrases are used as tags to tag the resources they lead to in the tree.

If the hierarchy of the tags matches the hierarchy of the Website at step 807, at step 808 the system tags each transitional node or resource with the anchor text that leads to visitor's browser to that node or resource. It is noted herein that there may be more than one hyperlink containing anchor text that leads to a same second level node (Webpage or resource). In this case the second level node is tagged with all of the anchor text instances that lead to it. The system automatically tags all of the linked resources including pages and other interactive throughout the structure creating a tag tree where the tags describe the nodes that they lead to. At step 809 the system may display the tag tree.

At step 810 the system may again validate that the Web tree hierarchy and tag tree hierarchy matches. If the two hierarchies do not match with reference to the mapping, then the process may loop back to step 808 to make sure each node was properly tagged looking for any possible errors made during the process. It is important that leads not be created where the visitor's intent is misidentified. For that reason each instance of anchor text may also be tested for correct navigation to the proper resource. If any errors or broken links are found they can be corrected or updated. Instances of anchor text that are not particularly descriptive of the source that they point to such as "click here" for example may be recoded to be more descriptive of the actual resource. This process may be used to fine tune inference of intent of visitor's to the site. If the hierarchies match at step 810 then the system saves and stores the intent tag structure along with the associated Website node structure for later reference. The system may then move to a next customer Website. Customer sites may be processed in batches automatically.

In the process of visitor monitoring and tracking, the intent tags manipulated by the visitor are mapped to paths in the Web tree. The "tags" of anchor text determine the intent of the visitor. The hierarchy of Web pages translates to a hierarchy of tags. The amount of time spent by a visitor on a "tag" equal the amount of time spent on all the tags in the sub tree under that "tag". Tag trees from multiple Websites analyzed would give us multiple hierarchies of intent. Whenever a visitor visits a monitored Website the tags associated with the visit are mapped to paths in the Website tree. The intent of a visitor is basically a function of a few things, the tags associated with the visit and the time period associated with each tag; and the path traversed by the visitor in the tree.

Converting a Website into a Hierarchy

One way to create a hierarchical structure from a Website is to do a "crawl" of the Website. The result of a website crawl is a graph of the website but the graph alone does not yield the hierarchy which is evident to human users upon visiting such a Website. Websites are typically designed as trees to decrease the time required to access a particular page. However, further links are added between inter-related pages to allow a user to easily access related content. This link addition process turns the tree into a graph. This graph is directed and cyclic. Let $G(V,E)$ be such a graph, which represents a website. Every page on the website is represented by a vertex in the graph. There exists an edge from a vertex v1 to another vertex v2, if the page p1 represented by vertex v1 contains a hyperlink to page p2, represented by vertex v2. The website root is termed as the root node of G. The tag tree T is inferred from this graph, such that all edges between two vertices in different sub-trees of T are eliminated. However, every graph has several spanning trees. Only one of these several spanning trees matches the hierarchical structure perceived by the website visitor. To determine which tree matches the to hierarchical structure, the following algorithm is used.

Firstly, the immediate successors of the root node are classified as different buckets. Buckets are sections into which the website can be divided based on the intent of the visitor, for example, Products, Solutions, and Services, all sections that relate to the items that the companies sell. Each bucket is assigned a certain weight based on its relative importance to marketing. These weights are represented on the edge from the root node to the immediate successor nodes.

Now for each vertex of G considered in the topologically sorted order:

(a) Determine the overall vertex weight. This weight is determined as a function of all the incoming edge weights. For example if a vertex v has 8 incoming edges, then vertex weight is determined by f(e1, e2, e8). Several functions may be used for f() viz. such as average, maximum, minimum etc.

(b) Assign an edge weight proportional to g(f( . . . )), where g() is typically implemented as a multiplicative dampening factor to the outgoing edges of v.

Secondly, use a spanning tree generation algorithm to determine the minimal (or maximal) spanning tree. Typical spanning tree algorithms include Edmond/Chu-Liu spanning tree algorithm. In summary and in actual practice, automatic generation of the spanning tree of the graph obtained after crawling a website is performed by . . .

(a) Classifying the top level nodes into buckets.
(b) Assigning weights to each of the buckets of step (a).
(c) Propagating the weights to each of the edges through appropriate vertex weight function and dampening factor functions.
(d) Computing the minimal (or maximal) spanning on the graph.

Tags of intent are used as a criterion for clustering visitors into visitor groups sharing similar intent. The association is determined using multiple techniques and sources including word similarity matching techniques which measure phrase distances; phrase corpuses for different information domains or industries or knowledge fields; and to phrases typed in search engines. In one embodiment application program interfaces (API's) to third-party applications like Bing™ and Google™ may be used to map the tags to specific departments, titles, people, and associated products and services. A person interested in a server would be associated with data center services, firewall, load balancer, etc.

Determining Visitor ID

Users browsing a site can be identified based on activities like form fill, response to an email, logging in to a partner site etc. Once the email ID is obtained the title of the person can be obtained through information available from publicly accessible sources. Once the title is determined, the website activity of that visitor may be marked with the title of the visitor. When a similar activity is observed, then the title of the visitor may be predicted based on historical data. Similarity amongst the activity can be measured by either of the following methods:

(1) Each node in the graph is associated with a probability of the node being visited by a person of a certain title. When a person visits a website, the probability of the various titles, from all the nodes traversed is determined and then the probability of a certain title is deduced.

(2) Matching all the nodes visited and finding the number of nodes matching to be greater than a certain threshold. A score may be computed using a function l(IPnode1, IPnode2, . . . ) where IP is the inverse page rank of the node. In case the scores of both the visits are within a certain threshold, then the visits may be considered to be similar.

(3) Matching the aggregate G-score of a previous visit with the G-score of the current visit. If these G-scores are within same range, then the titles are predicted to be the same. The first scheme described above has, in a preferred embodiment, a higher priority over the second. If the data for evaluating the first scheme is absent, then the second scheme may be initiated.

In case contact information is not provided and sufficient historical data does not exist to determine the identity of the visitor, then an alternate mechanism may be used. Each node of the spanning Tree T may be associated with a title or designation of the visitor who might show potential interest. The primary interest of the visitor is determined by picking the top n pages with the highest G-score. For each of these pages the title tag is extracted. For each title tag extracted, the contact information from the visitor's organization may be determined from the contact database. If no information exists then contact information may be determined for the parent node in the spanning tree T and in the absence of which the contact information of its parent node and so on.

(1) Determination of title of a visitor may be based on based on email ID using publicly available sources for email ID to title information, where the email ID can be obtained from a plethora of sources such as login information, form file, response to an email and the like.

(2) Tagging the nodes visited by a visitor whose title has been determined, with the title of the visitor.

(3) Discovering similarity between two visits by (a) computing a visit score on all pages visited using a function l(IPnode1, IPnode2, . . . ) where IP is the Inverse Page Rank of the node and (b) comparing the visit scores of two visits and finding it to be close to each other separated by not more than a certain threshold.

(4) Using the visit similarity to infer the title of the visitor.

(5) Using the aggregated G-score of two visits to find the similarity of two visits.

(6) Tagging the nodes of the website, with potential title of the visitor.

(7) Computing the probability of a certain title having visited the website by aggregating the probabilities of all the pages visited during that session, where each page is assigned a probability of visit by a visitor of a certain title visiting. The visitor title probability is obtained from historical data.

(8) Sorting the probability of the title of the visitor obtained from the aggregating the probabilities.

(8) Determining the visitor title information based on the nodes visited and using the contact database to determine the email IDs in the visitor's organization, where the visitor's organization is determined.

(10) Ordering contact information obtained based on the G-score of the visited nodes, where the G-score is computed.

There are several unique ways in embodiments of the present invention to identify visitors. One way is by emailing a visitor, once that visitor's email address is known, with an invitation to call an agent or an IVR system. The telephone number included in the email is a unique number, that is, it is not sent to any other visitor. The telephone number that the person uses to dial the agent thus becomes an identifier of the caller, and completes the association. Another is by including an html weblink in an email to the person, wherein a unique identifier is associated with the weblink sent in an email. If the person invokes the link in the email, the associated identifier completes the association. Still another means is by using any information determined about the person to access any number of on-line and otherwise accessible sources to add to the information about the person. For example, is the person's email address is known, that may be used as search criteria to access and search any number of data resources to determine more information.

Another important and innovative means of identification is by association with other visitors to a website. Giving a relatively large number of visitors who may each exhibit the same or similar behavior on the site, if ID and data are known for some of the visitors, it may be inferred that the other visitors, not yet identified are highly likely to have similar interests, business titles and the like to the visitors whose identity is known. The inference of like characteristics may be used as clues to further deduce other information about the yet-to-be identified visitors, leading eventually to identification.

Figure 9:
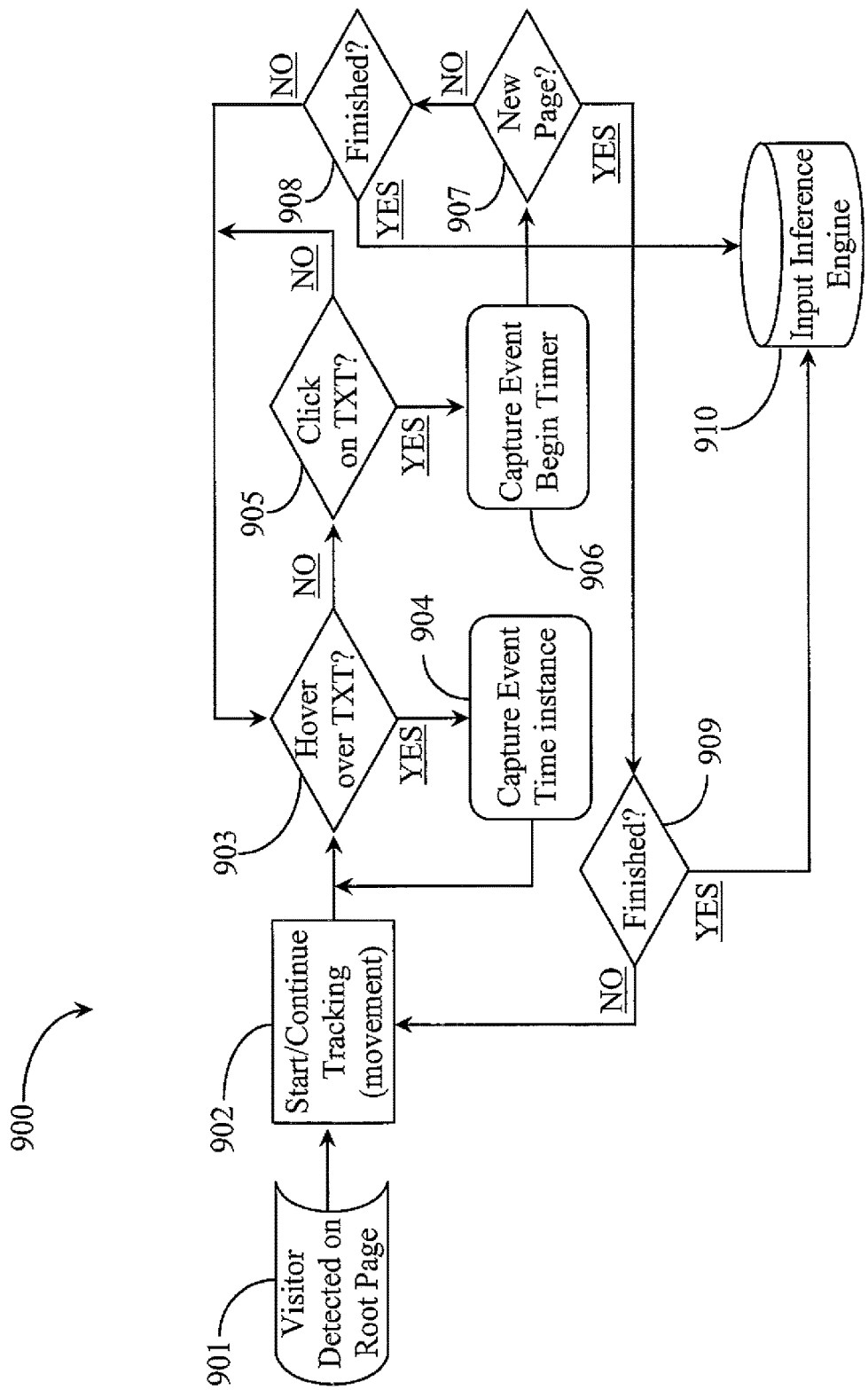
FIG. 9 is a process flow diagram illustrating steps for monitoring and tracking Web visitor mouse movement relative to anchor text for the purpose of inferring intent of the visitor according to an embodiment of the present invention.

FIG. 9 is a process flow diagram illustrating steps 900 for monitoring and tracking Web visitor mouse movement relative to anchor text for the purpose of inferring intent of the visitor according to an embodiment of the present invention. At step 901 a Web visitor is detected on the root page of the Website. At step 902 the system begins tracking the movement of the visitor. In one embodiment the system continues tracking the visitor if the visitor left and returned to the root page. It is also noted herein that a visitor may, in some cases, enter a Website by accessing a page further down the tree so it is important that the visitor is detected at any staring point of entry to the Website during a visit.

At step 903 the system determines if the visitor hovered over any anchor text. If the visitor hovered over an instance of anchor text then the system records or captures the event and the time spent hovering over the text at step 904. The process loops back to step 903 and proceeds again top step 904 every time the system detects a hover at step 903. This is ongoing during the total time of the visit. If the system determined that the user did not hover on any anchor text at step 903, the system determines at step 905 whether the visitor clicked on any instances of anchor text. If the user clicked on anchor text at step 905, then at step 906 the system captures the event and begins a timer to time the visitor under that "tag". The time a user spends under a root tag (anchor text clicked on) is the total time of the Web visit minus the time before the user clicked on any root tags. If the user did not click on any anchor text, the system loops back and continues to monitor the visitor relative to hover and click movements.

At step 907 the system determines if the anchor text clicked on by the visitor leads the visitor to a new Web page. If the system determines that the anchor text clicked on by the user invoked a new Webpage, then the process lops back to step 902 and the system continues tracking the visitor at the subsequent Web page. It is important to note herein that a visitor may click on an instance of anchor text, navigate to a new page of the site and then suddenly hit the back button on the browser to move back to the root page.

A user having navigated more than one page of the site may re-enter those pages already visited by manipulating the navigation history log in the visitor's toolbar to return to a selected page without clicking on any anchor text. However such navigation through the Website using the back/forward button on the browser or selecting a return page from the browser navigation history is detected and the user is continually tracked until the user exits the Website by terminating the online connection or by clicking on anchor text that leads to a page off site. In this regard having a robust link page may benefit determination of intent where the visitor selects one of the anchor text instances to navigate to a linked page.

At step 907 if the system determined that the anchor text the user clicked on does not take the visitor to another Webpage, then the system may determine at step 908 if the tracking process for that visitor is finished. The system may determine that the process is finished if the visitor leaves the Website and can no longer be tracked or goes offline. The system may determine that the process is finished if the visitor is still at the Website but no activity has occurred for a threshold period of time.

If the system determines that the tracking process is finished at step 908 then the results of monitoring the user are passed to the inference engine for that visitor and that visit at step 910. If the system determines that the visitor landed on another Webpage of the Website, the system may make a determination if the tracking process is finished at step 909. If the system determines that the tracking process is not finished for the visitor then the process moves back to step 902 where monitoring and tracking the visitor continues. If the system determines that the tracking process is finished at step 909, then the raw data captured during the visit for that visitor is passed to the inference engine as input for inferring the intent of the visitor.

In this example, process steps 900 refer to the visitor interacting with instances of anchor text which leads the user to another resource of the Web site or to a linked page offsite. However the tracking system may also track visitor interaction with a search engine at the site, interaction with hypertext that leads the visitor to another part of the same page, images, uploads, downloads, comments posted, form filling, multimedia consumption, contact activities (initiating communication from the site), and other activities that can be tracked. All of this information may be passed to the inference engine to aid in determining the intent of the visitor.

In a preferred embodiment of the present invention information gathered from monitoring visitor interaction with anchor text on the Website may be supplemented with information gathered from a plurality of sources including information gathered through page tagging of the website; information gathered from logs of the website; information gathered from contact databases; information gathered from search engines; and information available on other websites.

Such data may include date and time of monitored Web visits; the company that owns or is related to the IP Address associated with a Web visit by a visitor; company to which the visitor is employed or is affiliated with; visitor Location including geographic location latitude and longitude of the visitor, and the city, state, and country of the visitor.

Other information that may be collected about the visitor may include name, email addresses, phone numbers, and other contact details of the visitor if the visitor can be identified without ambiguity. One method of unambiguously determining the identity of the visitor is through correlation of a previously identified visit where a mapping between the information sent by the browser of the visitor is associated with the identity and contact information of the visitor.

If a visitor cannot be identified without ambiguity then the system may gather names, email addresses, phone numbers, and other contact details of possible visitors if there is ambiguity about the identity of the visitor. This information may be obtained from third party contact databases that list people in various companies along with their names, email addresses, location information, and phone numbers. The possible visitors are determined by using a plurality of information including company name associated with the visitor, the geographical location of the visitor, inferences made about the visitor's department and title made from the browsing patterns and the phrases and keywords browsed by the visitor. The probable set departments and titles of the visitor can also be determined based on prior knowledge about who usually visits the website that is gathered from a plurality of sources including input from the website owners and operators.

The system uses the visitor's browsing pattern, time spent, click pattern, and mouse movement data on every page on a monitored website to infer the keywords and phrases of interest, and the pages of interest to the visitor. The result of this inference may be further analyzed to determine the intent of the visitor; the level of intent or engagement of the visitor; whether the visitor is interested in a product family or product to category or a solution family or a solution category.

In one embodiment information about a Website or Web page visited prior to arriving at a monitored Website is collected if available including the URL of the Website or page, the URL structure, the URL path, any query strings, and any search terms used at a search engine if the referring page is a search engine page. Such information may include page title, meta-tags, text, hyperlinks, anchor text, hypertext, and non-text elements on the previous page.

All of the information collected about the visitor may be correlated to information previously collected from the same visitor to the same site. The data sets for multiple visitors to the same site might be correlated to determine which visitors have one or more attribute in common such as such as affiliation with the same company or visiting from the same geography or visiting around the same time of day or sharing the same set of Web pages visited or sharing the same referrer or sharing the same set of search terms or time spent on an individual Web page or total time spent on the website (using correlation information to automatically classify the anchor text).

In a preferred embodiment all of the data collected about visitors including that of clustered visitors or groups is packaged into one or more information or lead capsules that may include phrases of interest to the visitors; text and non-text elements which were of interest to the visitor (combination of hypertext, anchor text in hyperlinks, page title, meta-tags, search terms used, text either visible or invisible on the referring page, non-text elements either clicked on or hovered on by the visitor etc.); pages of interest to the visitor; pages visited during the visit and all visible and invisible text and non-text elements on all the pages visited along with text and non-text elements extracted from mouse movement and mouse hovering information on all the pages visited.

The information capsules or "lead" capsules also contain, in preferred embodiments indications of visitor intent; name and contact information of the visitor (if identified without ambiguity) or names and contact information of possible visitors (if there is ambiguity); company affiliation, department, title, extension, etc. In one embodiment information from a sales or marketing campaign may be collected if the visitor was referred to a tracked Website through a campaign like an email campaign, a webinar, a search engine campaign, a tradeshow, or the like. Historical data may be retained relative to a visitor's past visits, data from past visits by visitors of a same organization; data from past visits by related companies, and any of the information from past visitors who may share any of the above elements in common with the visitor. Statistical analysis may be performed on visitor clusters to infer intent of the cluster of visitors.

It will be apparent to one with skill in the art that the information gathering and lead generation system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A method comprising:
   accessing a behavior of a visitor interacting with a website accessed via Internet and a sequence thereof, using an input mechanism to interact with a graphical user interface rendered on a display device, wherein the behavior includes interactions with a first anchor text of the website wherein the first anchor text remains unselected, and wherein the behavior includes interactions with a second anchor text of the website wherein the second anchor text is associated with a hyperlink that is selected, wherein a tag associated with selection of the second anchor text is generated and wherein the tag is associated with the website and user interaction thereof;
   automatically determining an intent of the visitor based on the behavior, wherein the determining is further based on a combination of semantic, syntactic, and statistics associated with the visitor interacting with the first anchor text and the second anchor text, and wherein the determining is by comparing a hierarchical structure of anchor texts to hierarchical structure of the website; and
   outputting the intent of the visitor, a level of intent of the visitor, supporting data associated with the intent of the visitor, and a sales lead based on the intent of the visitor.

2. The method of claim 1, wherein the behavior includes highlighting of rendered information on the display.

3. The method of claim 1, wherein the second anchor text associated with the hyperlink is associated with selectable vector graphics and wherein the second anchor text is invisible to the visitor.

4. The method of claim 1, wherein the behavior includes mousing over the first anchor text.

5. The method of claim 1 further comprising tracking a time associated with interactions with the first anchor text and tracking the time associated with interactions with the second anchor text.

6. The method of claim 1, wherein the method further comprises using one or more application program interfaces (APIs) to access one or more third-party data-gathering and holding services, wherein data from the one or more third-party data-gathering and holding services is operable for fine tuning the level of intent of the visitor and operable to unambiguously identify the visitor.

7. The method of claim 1, wherein the second anchor text associated with the hyperlink is selected from the group consisting of a multimedia presentation, an interactive form, and a data download or upload interface.

8. The method of claim 1, wherein the second anchor text associated with the hyperlink is a visible text.

9. A method for determining a sales lead, the method comprising:
   accessing a behavior of a visitor interacting with a website accessed via Internet, using an input mechanism to interact with a graphical user interface rendered on a display device and the sequence thereof, wherein the behavior includes interactions with a first anchor text of the website wherein the first anchor text remains unselected, and wherein the behavior includes interactions with a second anchor text of the website wherein the second anchor text is associated with a hyperlink that is selected, wherein a tag associated with selection of the second anchor text is generated and wherein the tag is associated with the website and user interaction thereof;

determining an intent of the visitor based on the behavior and further based on a combination of semantic, syntactic, and statistics associated with the visitor interacting with the first anchor text and the second anchor text;

determining, by an electronic device, the sales lead based on the intent of the visitor;

outputting the intent of the visitor, a level of intent of the visitor, supporting data associated with the intent of the visitor, and the sales lead based on the intent of the visitor; and automatically placing a call to the visitor and offering sales that are related to the intent of the visitor.

10. The method of claim 9, wherein the behavior includes highlighting of rendered information on the display.

11. The method of claim 9, wherein the second anchor text associated with the hyperlink is associated with selectable vector graphics and wherein the second anchor text is invisible to the visitor.

12. The method of claim 11, wherein the behavior includes mousing over the first anchor text.

* * * * *